(12) United States Patent
Richards

(10) Patent No.: US 7,278,510 B1
(45) Date of Patent: Oct. 9, 2007

(54) SHIFTING SYSTEM FOR AN AUTOMOBILE AUTOMATIC TRANSMISSION

(75) Inventor: Arthur K. Richards, Fallbrook, CA (US)

(73) Assignee: American Supercars and Prototypes, LLC, Fall Brook, CA (US)

( * ) Notice: Subject to any disclaimer, the term of this patent is extended or adjusted under 35 U.S.C. 154(b) by 426 days.

(21) Appl. No.: 10/829,773

(22) Filed: Apr. 22, 2004

(51) Int. Cl.
*B60K 17/00* (2006.01)

(52) U.S. Cl. .................. 180/336; 74/335; 74/473.31

(58) Field of Classification Search ............... 180/333, 180/336; 74/335, 336, 473.31, 473.32
See application file for complete search history.

(56) References Cited

U.S. PATENT DOCUMENTS

| | | | |
|---|---|---|---|
| 4,960,008 A | 10/1990 | Yen et al. ................ 74/473 |
| 6,073,511 A * | 6/2000 | Umezawa et al. ....... 74/473.25 |
| 6,120,412 A | 9/2000 | Fujinuma .................... 477/99 |
| 6,151,977 A | 11/2000 | Menig et al. ............ 74/336 R |
| 6,487,484 B1 * | 11/2002 | Shober et al. .............. 701/51 |
| 6,532,841 B2 * | 3/2003 | Medico et al. ............ 74/335 |
| 6,532,842 B1 * | 3/2003 | Arai et al. ............... 74/473.31 |
| 7,137,499 B2 * | 11/2006 | Riefe et al. ............. 192/220.2 |
| 2003/0106388 A1 * | 6/2003 | Arai et al. ............... 74/473.32 |
| 2004/0139815 A1 * | 7/2004 | Shimamura et al. ......... 74/335 |
| 2005/0202932 A1 * | 9/2005 | Burzio ........................ 477/97 |
| 2006/0005646 A1 * | 1/2006 | Riefe et al. .................. 74/335 |

\* cited by examiner

*Primary Examiner*—Paul N. Dickson
*Assistant Examiner*—Toan C. To
(74) *Attorney, Agent, or Firm*—Louis L. Dachs

(57) ABSTRACT

The invention is an automatic transmission shifting system for automobile, the automobile having a steering column assembly including a steering wheel at one end and steering column, and an electrical wire having first end terminating at the steering wheel and a second end terminating at least partially down the steering column. The system includes a first shifting actuator mounted to the steering wheel assembly, the first shifting actuator for initiating up shifts in the transmission by movement thereof and providing a first up shift signal to the first end of the wire. A second shifting actuator mounted is on the steering wheel assembly, the second shifting actuator for initiating down shifts in the transmission by movement thereof and providing down shift signals to the first end of the wire. Transmission actuation means is provided for up shifting and down shifting the transmission in response to the first up shifting and the second down shifting signals, respectively.

11 Claims, 20 Drawing Sheets

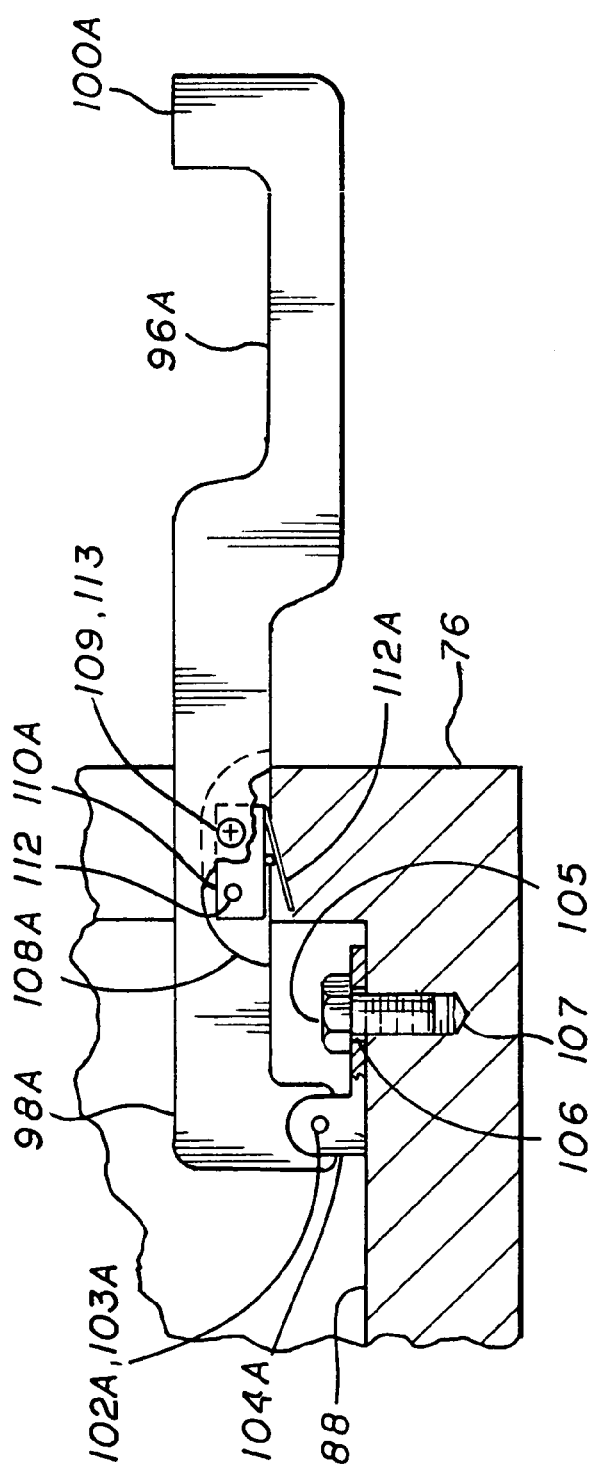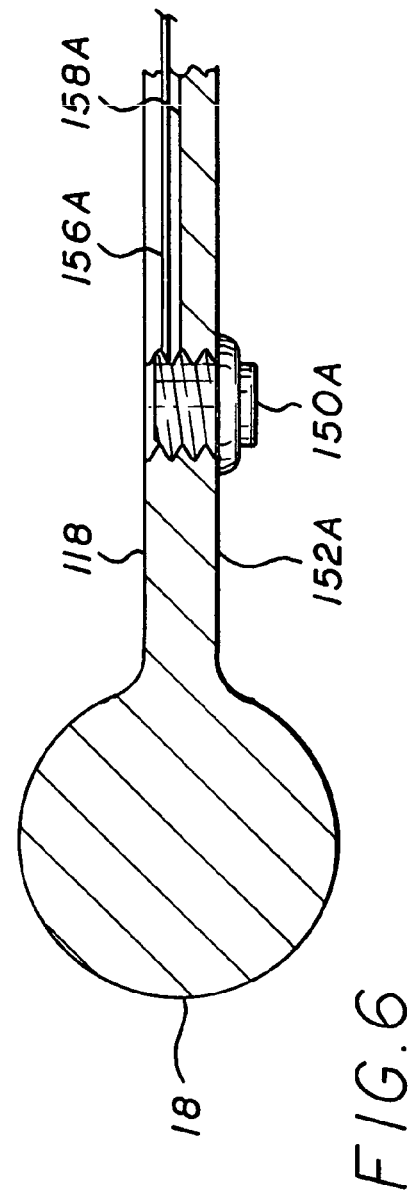

WIRING OF PART 114

WIRING OF PART 114A

SHIFTING SYSTEM FOR AN AUTOMOBILE AUTOMATIC TRANSMISSION

BACKGROUND OF THE INVENTION

1. Field of the Invention

The invention relates to the field of shifting systems for automatic transmissions and, in particular, to a steering wheel mounted shifting system suitable for after-market instillation.

2. Description of Related Art

Originally all transmission shifting was accomplished manually with a stick type shifter positioned on the floor. However, this made three abreast seating in the front seat of the automobile difficult. To provide for three abreast seating in the front seat, column-mounted manual shifting systems became popular. This mounting position remained popular even when automatic transmissions were introduced. However, sport cars and most racing cars still used floor-mounted shifters. Chrysler Corporation in the 1950's time frame introduced a push button controlled transmission located in the center of the steering wheel hub. However, it proved to have a short life and the column mounted shift lever remained the standard.

When the sport or sporty car became popular, the trend reverted back to mounting the shifter on the floor, in reality on top of the transmission. In fact, with the advent of "bucket seats" limiting the front of the passenger compartment to two, center mounting the shifter was a significant cost saver. However, more recent advancements, particularly in Formula One racing cars, have produced automatic shifting manual transmissions. That is by use of electronics and hydraulic or electric actuators, a manual type transmission with clutch that can be automatically shifted. This advancement led to the placement of the shifting mechanism back on to the steering column, where paddles and the like accomplish shifting. Presently, this concept is being introduced into production automobiles. In fact, it is being used in conjunction with automatic transmissions on cars manufactured by Porsche and the Pontiac Division of General Motors. Many other manufactures are expected to follow with such shifting systems.

Thus there is a need for after-market conversion kits to convert floor mounted and column mounted shifting systems to a steering wheel-mounted system. A system to convert manual transmissions with a floor-mounted shifter is disclosed in U.S. Pat. No. 4,960,008 Automotive Transmission Linkage System. Here an electromechanical actuator system is connected to gearshift lever of a manual transmission. The actuator system is connected to a push button shifting control device mounted on the steering column. This after market device, while designed for a manual transmission does perform the function of gear selection.

However, this system does not address several of the major problems of after-market installation. First of all, it is important that the system be easily installed on a wide variety of automobiles. In addition, the existing wiring systems within the automobile must not be unduly affected, lest the product be too costly to install. It must also meet all existing safety requirements. For example, shifting out of the park position can not be accomplished unless the break pedal is depressed. It must not affect airbag performance in any way.

Thus, it is a primary object of the invention to provide a transmission shifting system that converts a floor mounted and column mounted shifting system to a steering wheel mounted system for after-market installation on automobiles with automatic transmissions.

It is another primary object of the invention to provide a transmission shifting system that converts a floor mounted and column mounted shifting system to a steering wheel mounted system for after-market installation on automobiles with automatic transmissions that does not require extensive modification to the wiring system of the automobile.

It is a further object of the invention to provide a transmission shifting system that converts a floor mounted and column mounted shifting system to a steering wheel mounted system for after-market installation on a wide variety of automobiles with automatic transmissions.

SUMMARY OF THE INVENTION

The invention is an automatic transmission shifting system for vehicles with the vehicle having a steering column assembly including a steering column and a steering wheel at one end. The steering column includes an electrical wire having a first end terminating at the steering wheel and a second end terminating at least partially down the steering column. The wire is typically the wire connecting the horn actuator on the steering wheel to the horn or horn relay. In detail, the invention includes a first shifting actuator assembly mounted to the steering wheel assembly. The first shifting actuator assembly is adapted for initiating up shifts in the transmission by movement thereof and providing a first up shift signal to the first end of the wire. A second shifting actuator assembly is also mounted on the steering wheel assembly and is adapted for initiating down shifts in the transmission by movement thereof and providing down shift signals to the first end of the wire. Typically, the first and second actuator assemblies include levers movably mounted behind and on either side of the steering wheel. Alternately, the first and second actuator assemblies can be buttons mounted on the support arms of the steering wheel. A transmission actuation system is included for up shifting and down shifting the transmission in response to the first up shifting and the second down shifting signals, respectively.

The first shifting actuator assembly includes a first normally open switch coupled to the wire in series with a first resistor with a first resistance value, such that when said first switch is closed a first current is produced in the wire. The second shifting actuator assembly includes a second normally open switch coupled to the wire in series with a second resistor with a second resistance, such that when the second switch is closed a second current is produced in the wire.

Alternately, the pair of buttons can be used for up shifting and the pair of levers can be used for down shifting or vice versa. This requires that the switches associated with the buttons are in series with the first resistor and the switches associated with the levers are in series with the second resistor, or vice versa.

The transmission actuation system is coupled to the second end of the wire in the steering column and is designed to recognize the first and second currents in the horn wire. The transmission actuation system is also adapted to up shift or down shift the transmission in response to the first and second currents.

In one embodiment, the transmission control assembly includes a micro-controller programmed to control a linear actuator coupled directly to the existing gearshift lever mounted on the center console or column. In a second version wherein the transmission is electronically controlled by solenoid valves, the micro-controller is programmed to control the solenoid valves. Thus once the transmission is shifted into the drive position; gear shifting through the gears is accomplished from the steering wheel. In this second version, the safety interlocks remain active. For example, the requirement that the brake pedal be depressed before shifting out of park, the requirement that the automobile be at rest prior to shifting into reverse, etc. However, these signals are provided to the micro-controller, preventing that inadvertent movement of the actuation shifter assemblies on the steering wheel result in invalid states of the solenoid valves. In a third embodiment, the existing gearshift lever is removed and the actuator is coupled to the transmission with a cable or shaft. In these latter versions, the existing safety interlocks are inactivated. In this case the brake and speed sensor signals are routed to the micro-controller, which provides the safety interlocks.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 5 is a partial cross-sectional view of FIG. 2A illustrating the mounting of the shifter assembly.

FIG. 6 is a partial cross-sectional view of the steering wheel shown in FIG. 3A illustrating the mounting of button switches thereon.

DESCRIPTION OF THE PREFERRED EMBODIMENT

Figure 1:
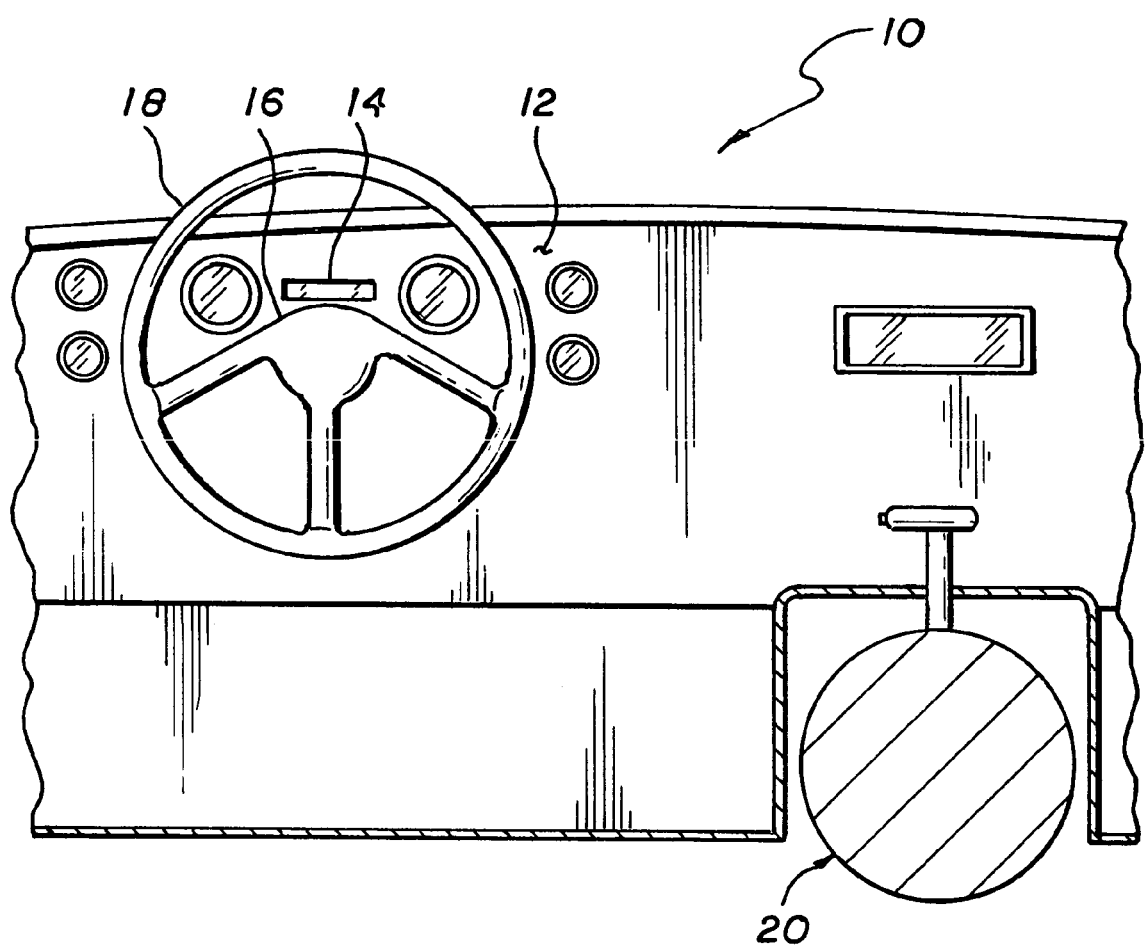
FIG. 1 is a partial view of the interior of an automobile dashboard, steering column and center counsel with transmission shifter.
Figure 2D:
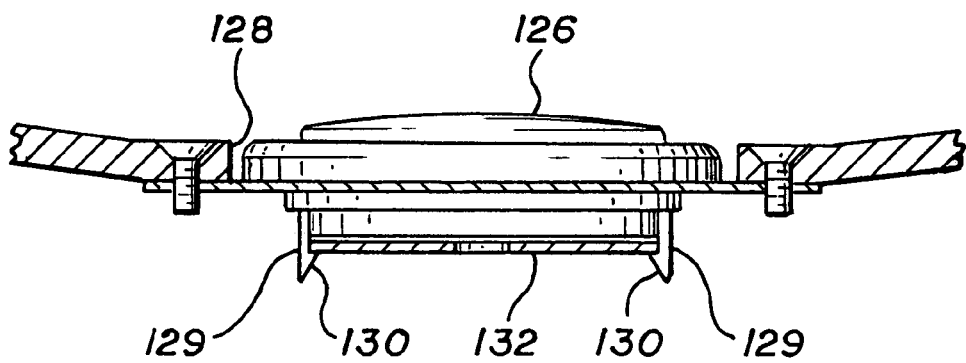
FIG. 2D is an enlarged cross-sectional view of the steering wheel and horn assembly shown in FIG. 2A.
Figure 2A:
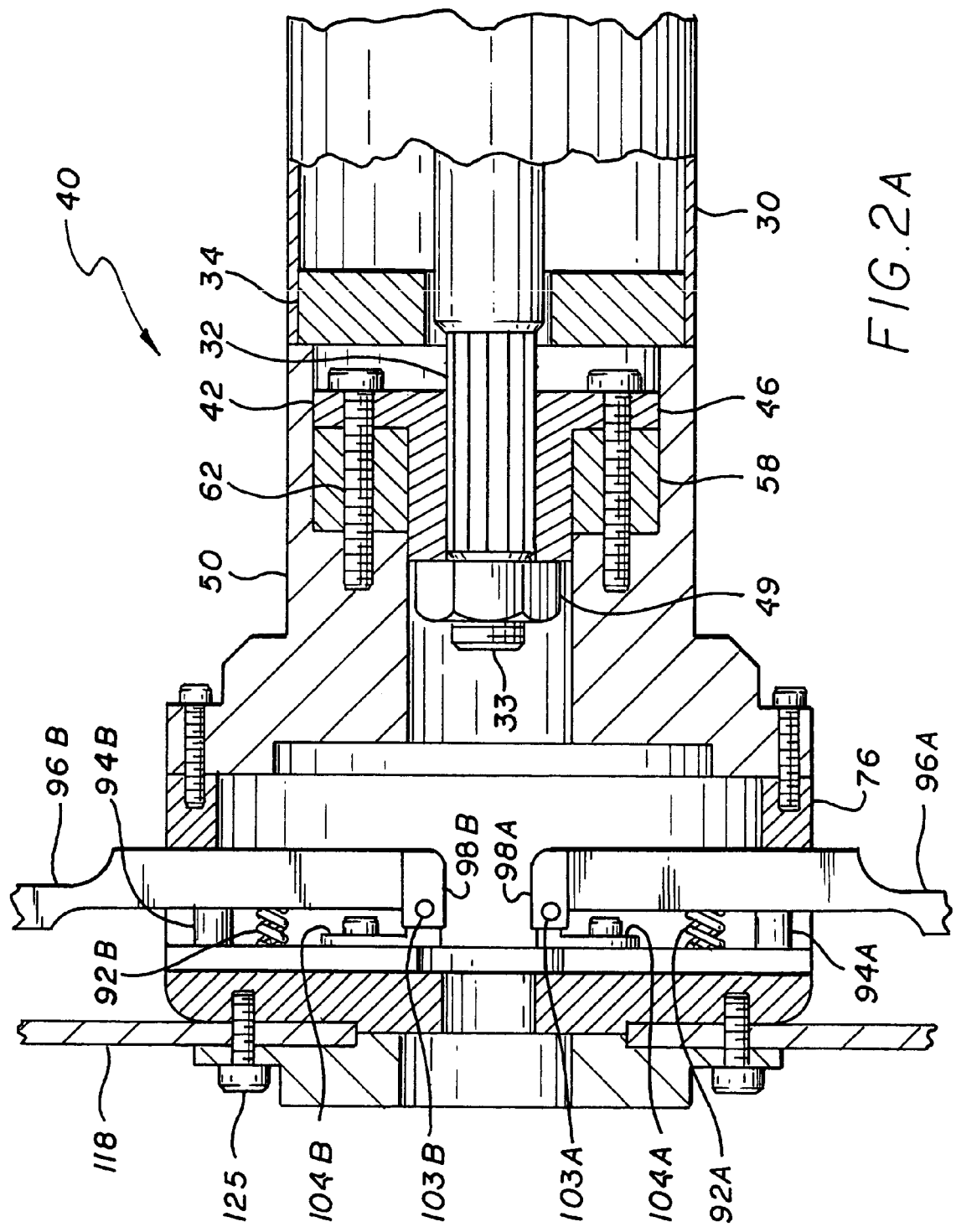
FIG. 2A is a cross-sectional view of a shifting system incorporating paddle type shifters on the steering wheel assembly shown in FIG. 1
Figure 2B:
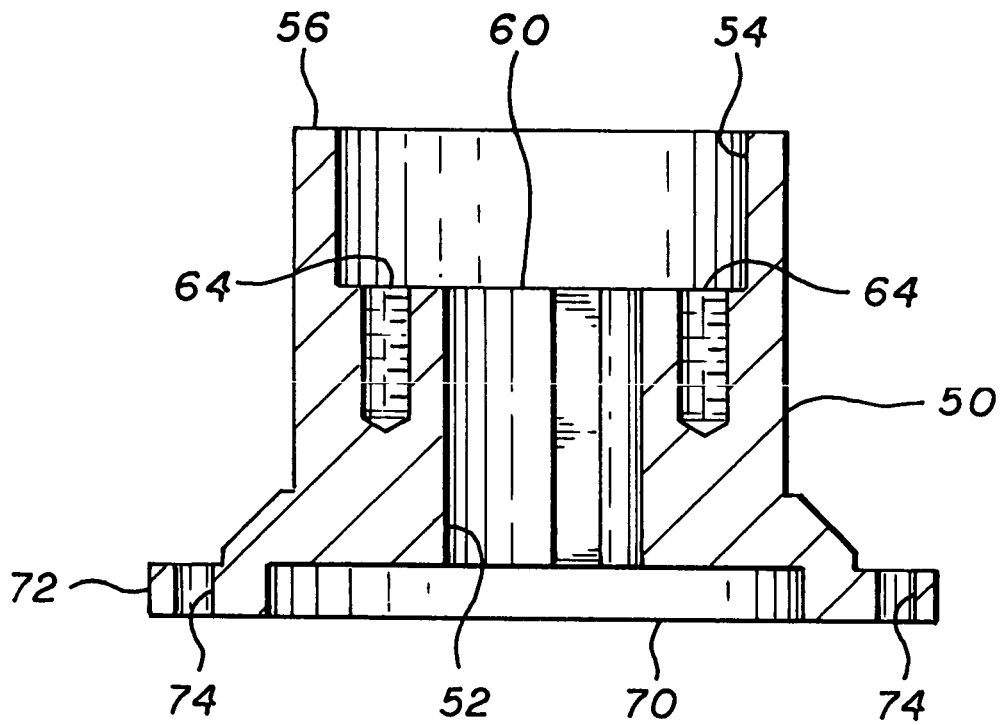
FIG. 2B is an enlarged cross-sectional view of the housing shown in FIG. 2A.
Figure 2C:
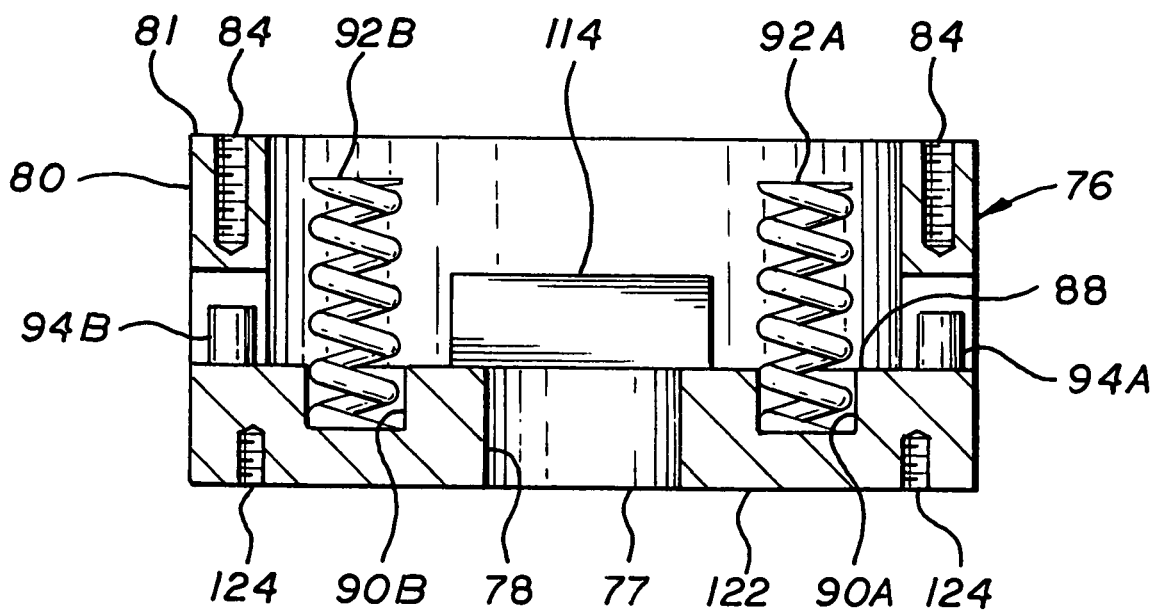
FIG. 2C is an enlarged cross-sectional view of the cover shown in FIG. 2A.

Referring to FIG. 1, which is a partial view of the dashboard of an automobile, the dashboard 10 includes an instrument panel 12, a transmission gear selector display 14. Also illustrated are the steering column 16 and steering wheel 18, and transmission 20.

Referring to FIG. 1 and additionally to FIGS. 2-6 the existing steering wheel hub assembly (not shown) is removed and a replacement assembly is attached to the steering column 30 via the existing splined shaft 32 with a threaded end 33. However, the existing horn wire slip ring assembly 34 remains in place. Any existing turn indicator 35 and windshield washer control 38 remain unaltered. The steering wheel shifter assembly, generally indicated by numeral 40 includes an adapter 42 having internal splines 44 adapted to mate with the splined shaft 32. Thus each adapter 42 may have different internal splines 44 depending upon the automobile make and model. It would be provided with the after market kit designed for use with the particular make and model. The adapter 42 includes a circular shaped flange 46 having three holes 48. It is secured to the shaft 32 by means of nut 49 that threadably engages threaded end 33. A single horn wire 51 extends up the steering column and connects to the slip ring 34 and a second wire 51A exits from the slip ring, such that the wire does not have to twist as the steering wheel is rotated.

A housing 50 includes a hole 52 having a counter bore 54 at end 56. The counter bore 54 is sized to receive and support both the adapter 42 and a spacer 58, which abut an internal wall 60 with in the housing 50. The spacer 58, also includes three fastener holes 59, and may vary in length depending upon the model of the automobile and is used to insure the proper overall length of the steering wheel assembly remains identical to the factory setting. Three fasteners 62 extend through holes 48 in the adapter 42 and holes 59 in the spacer 58 and engage threaded holes 64 in the internal wall 60. Thus the adapter 42, spacer 58 and housing 50 are all secured to the steering column 30. The end 70 of the housing 50 includes a flange 72 having a plurality of fastener holes 74 equally spaced thereabout. A cup shaped cover 76 includes an end wall 77, with a through hole 78, and sidewall 80 having slots 82A and 82B therein. The end 81 of the sidewall 80 includes thread holes 84. Fasteners 86 extending through holes 74 in the housing 50 and threads into holes 84 joining the cover 76 to the housing.

Particularly referring to FIGS. 2C, 3B, 4 and 5, the cover 76 includes two slots 82A and 82B in the sidewall 80. The interior-facing surface 88 of the end wall 77 includes holes 90A and 90B in which are bonded two coil springs 92A and 92B that protrude out therefrom. A pair of elastic stops 94A and 94B are also bonded to the surface 88. A pair of paddle type arms 96A and 96B are movably mounted to the surface 88 by their first ends 98A and 98B with their second ends 100A and 100B extending out of the slots 82A and 82B. In detail, each arm 96A and 96B includes holes 102A and 102B at their first ends 98A and 98B through which pins 103A and 103B extend there through. Each pin 103A and 103B is mounted in upper and lower support members 104A and 104B. The support members 104A and 104B are secured to the wall 88 by screws 105, which extend through holes 106 and engage threaded holes 107. Thus the arms 96A and 96B can rotate about the pins 104A and 104B, respectively. The arms 96A and 96B contain slots 108A and 108B in which are mounted normally open electrical switches 110A and 110B, the mounting of which will be subsequently discussed.

Referring to FIGS. 2-8, the switches 110A and 110B include actuating arms 112A and 112B that contact the stops 94A and 94B on the surface 88. Thus movement of the arms toward the surface 88 will cause the switches 110A and 110B to actuate to the closed position. Each switch 110A and 110B include holes 112 and are held in place by screws 109 that engage threaded holes 113 in the arms 96A and 96B that extend through the holes 112 in the switches, thus locking them in place. The switches 110A and 110B are connected by wires 133A and 133B to an electronic module 114, also connected to the wire 51A, which is also mounted in the cover 76, typically bonded or otherwise jointed to the surface 88. The function of this module 114 will be subsequently discussed.

A steering wheel 116 includes a center hub 118 having a plurality of holes 119 in a circular pattern and a rim 120 mounted thereto. The exterior facing surface 77 of the cover 76 includes a plurality of threaded holes 124 in a pattern similar to the holes 119 in the center hub 118. Fasteners 125 secure the steering wheel 116 to the cover 76. A horn button assembly 126 is mounted in a center hole 128 in the hub 118, which includes a switch (not shown). The horn assembly 126 includes a pair of tangs 129 having locking members 130, which extend through the hole 128 and engage a snap ring 132. Thus once the locking members 130 engage the snap ring 132; the horn assembly is locked in place.

Figure 7:
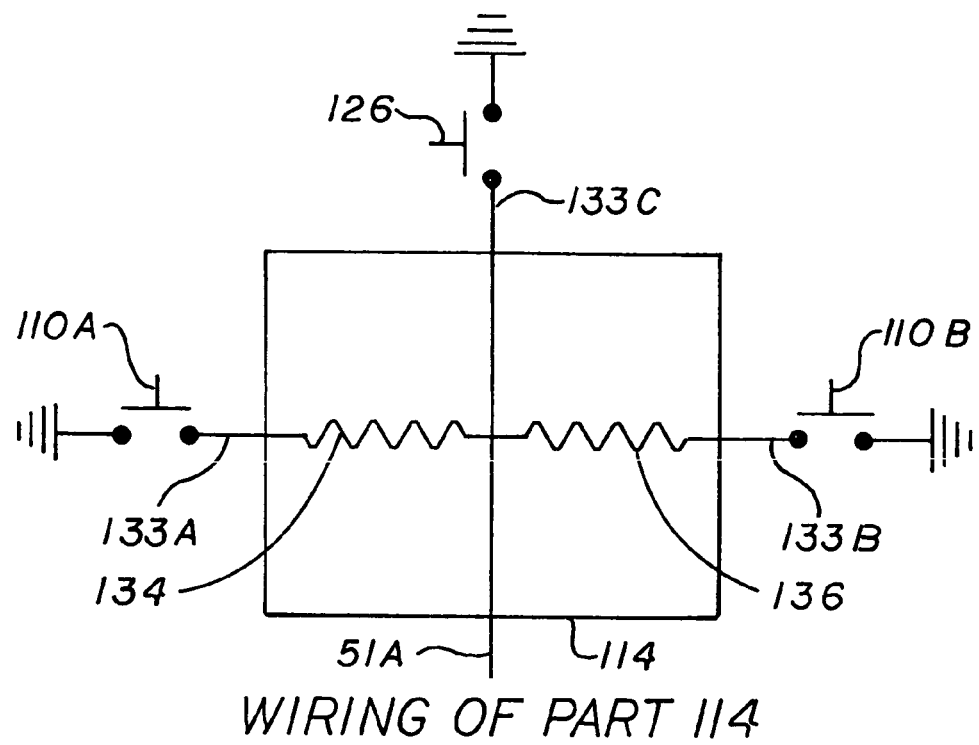
FIG. 7 is a schematic of the circuit for connecting a pair of shifting actuators to a single wire in the steering column.

Referring to FIG. 7 the switches 110A and 110B and horn assembly 126 are electrically connected to the module 114 via wires 133A, 133B and 133C, respectively. The switch 110A and 110B are connected to the horn wire via resistor 134 (a resistance value of 1 kΩ) and resistor 136 (a resistance of 430 Ω) while the horn assembly is directly connected thereto. Thus it can be seen that the horn wire 51A is grounded whenever switches 110A or 110B or the horn assembly 126 are actuated.

Figure 3A:
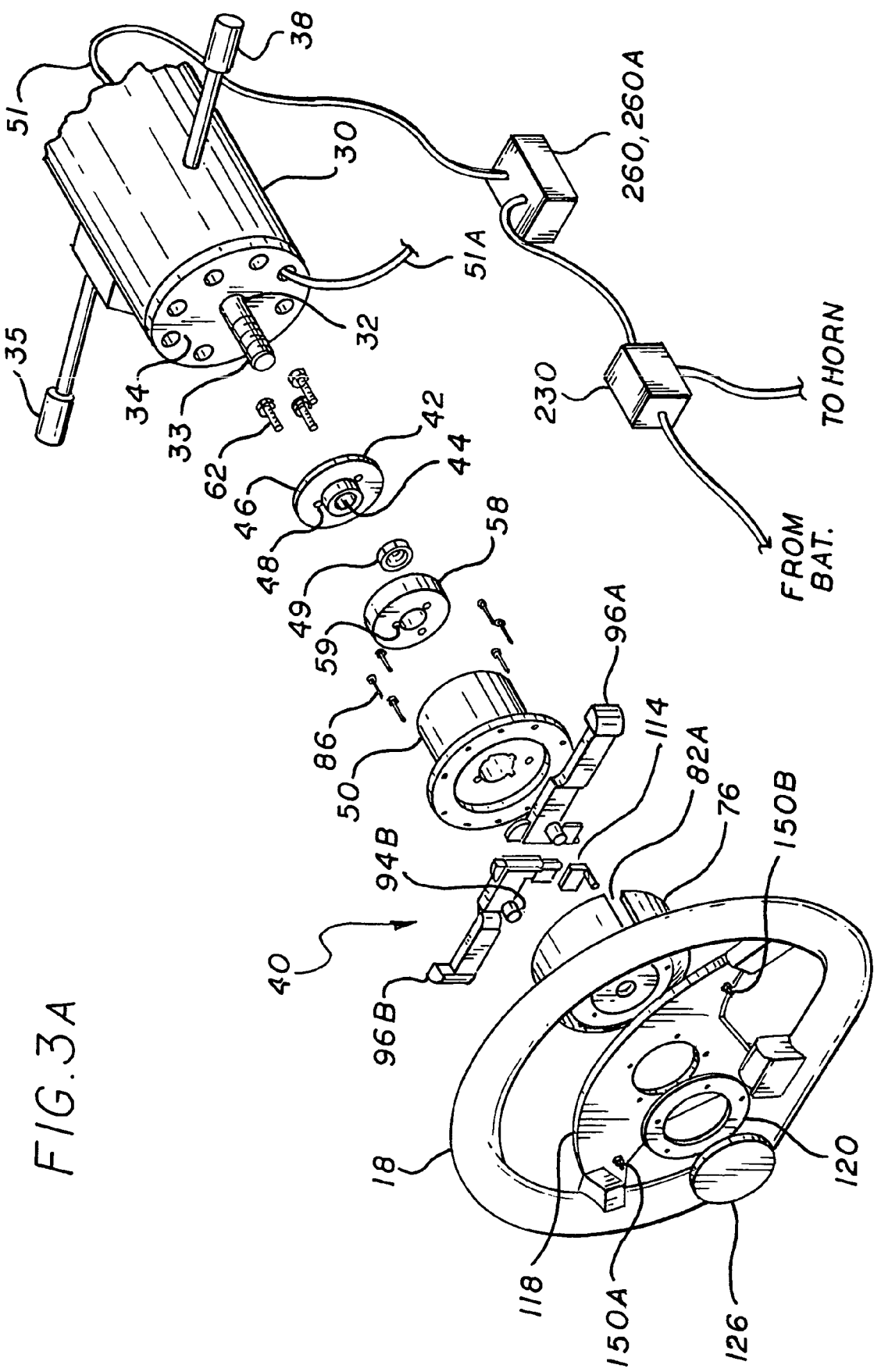
FIG. 3A is a partial exploded view of the steering wheel assembly shown in FIG. 1 along with part of the transmission control circuit.
Figure 3B:
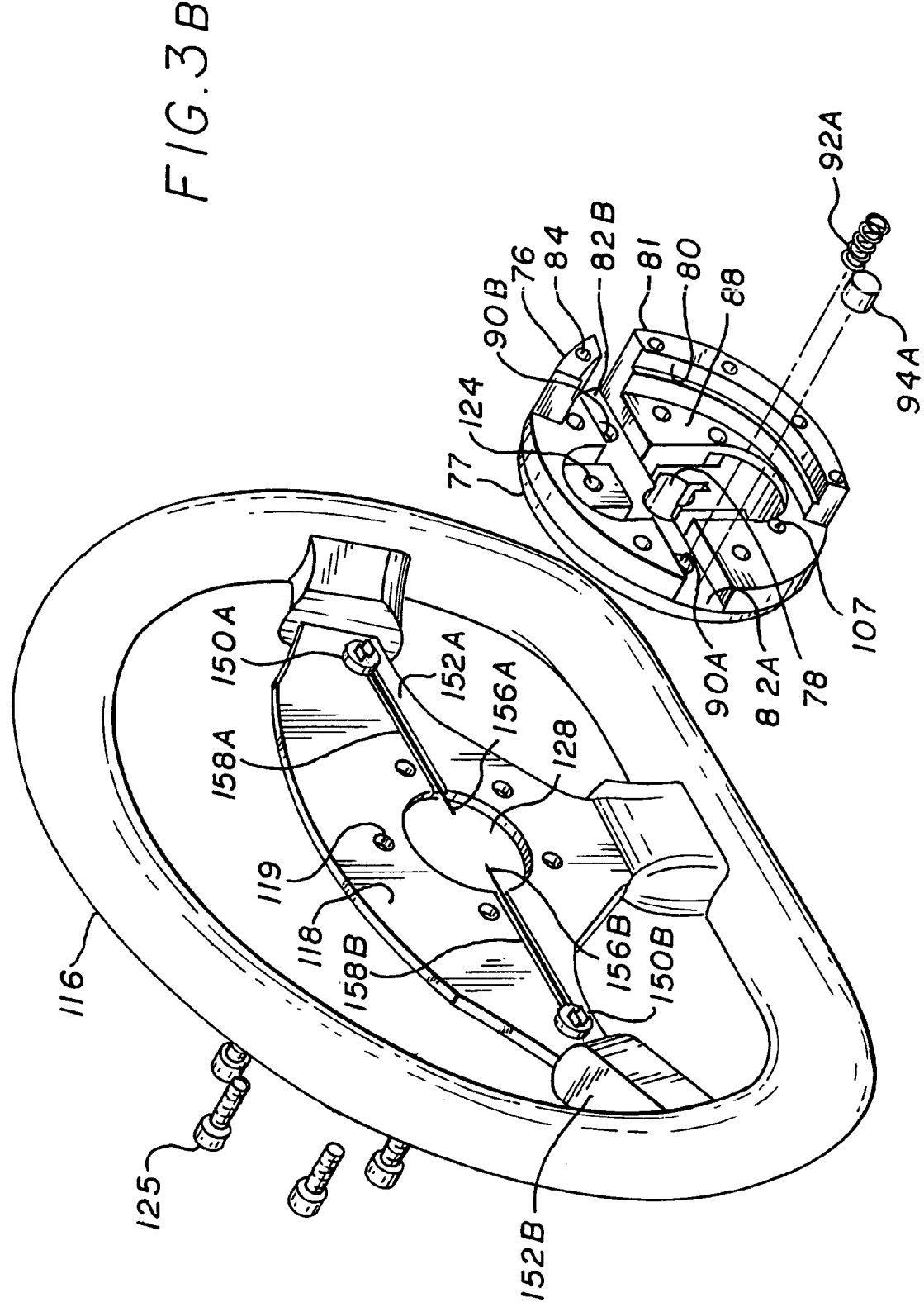
FIG. 3B is a partial exploded view of the steering wheel and cover shown in FIG. 3A.
Figure 4:
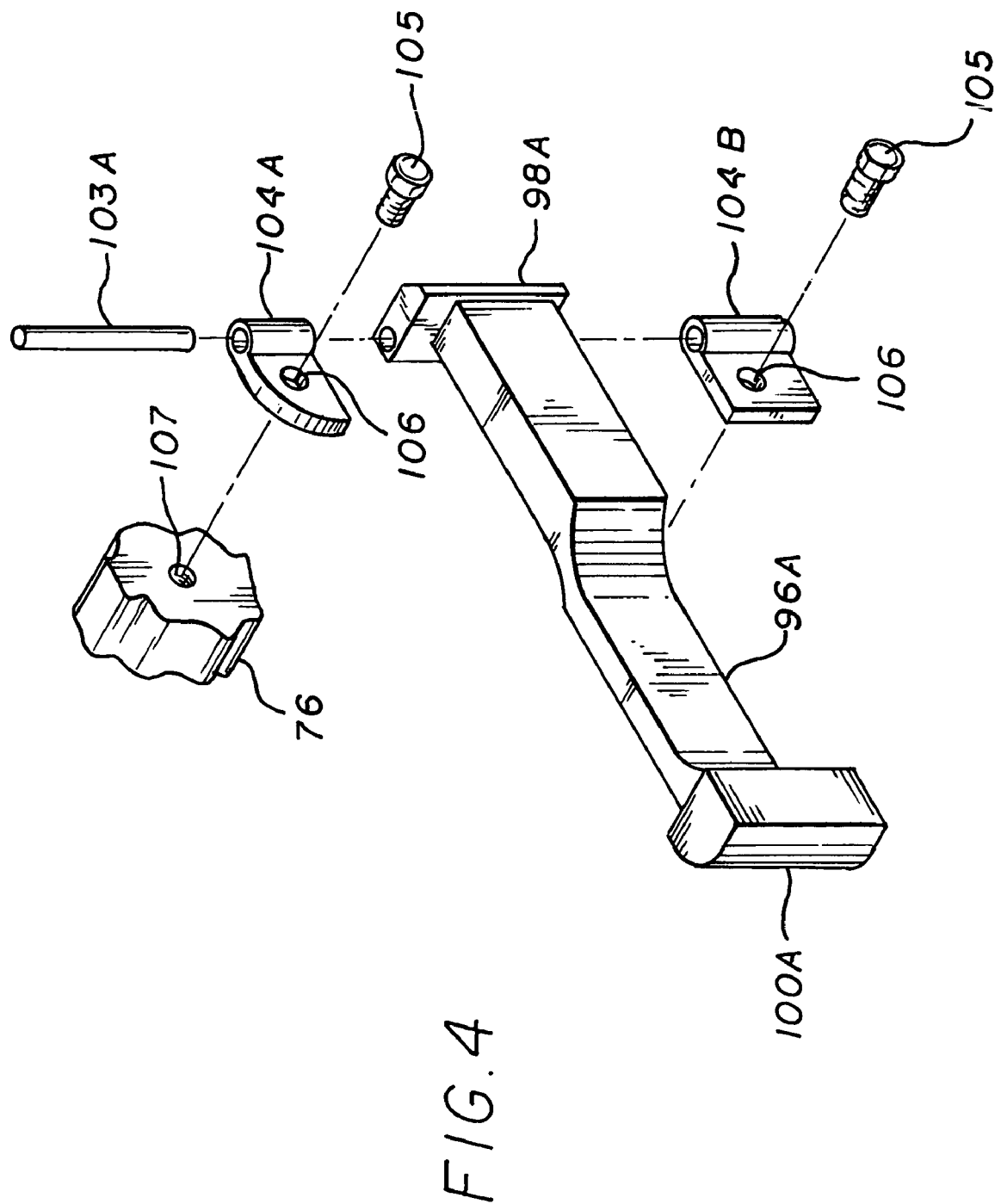
FIG. 4 is a partial exploded view of the steering wheel assembly shown in FIG. 3A illustrating the mounting of the shifter assemblies.

The above-described system, having one up shifting actuator and one down shifting actuator, is sufficient. However, because the steering wheel may be rotated from two to four times lock-to-lock, some confusion may occur as to what lever up shifts and down shifts. This can be avoided by incorporating a second set of actuator buttons on the steering wheel, also illustrated in FIGS. 2-6. Referring particularly to FIGS. 3A and 3B the two button actuated switches 150A and 150B mounted on the spokes 152A and 152B connected by wires 156A and 156B running in channels 158A and 158B and potted by a resin therein and connected to the electronic module 114A similar to module 114 except that it is wired to accept two up shift signals and two down shift signals. Thus the actuators 110A and 110B can be used for up shifting and the switches 150A and 150B can be used for down shifting, or vice versa.

Figure 8:
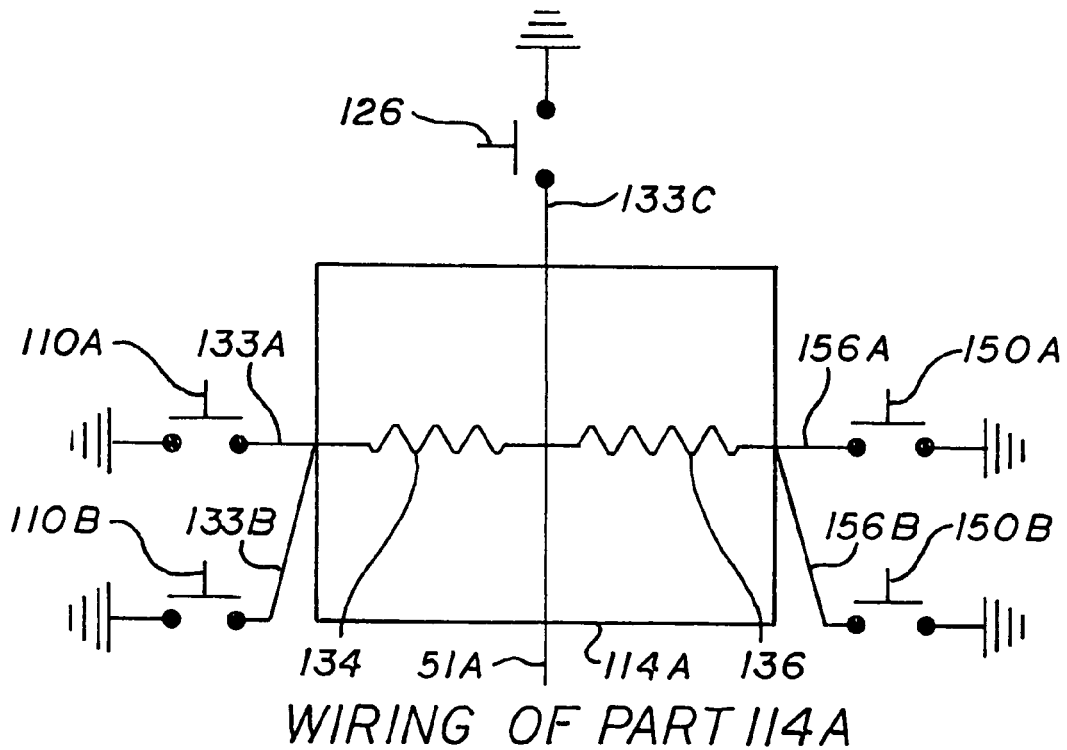
FIG. 8 is a schematic of a circuit for connecting two pairs of shifting actuators to a single transmission wire in the steering column.
Figure 9:
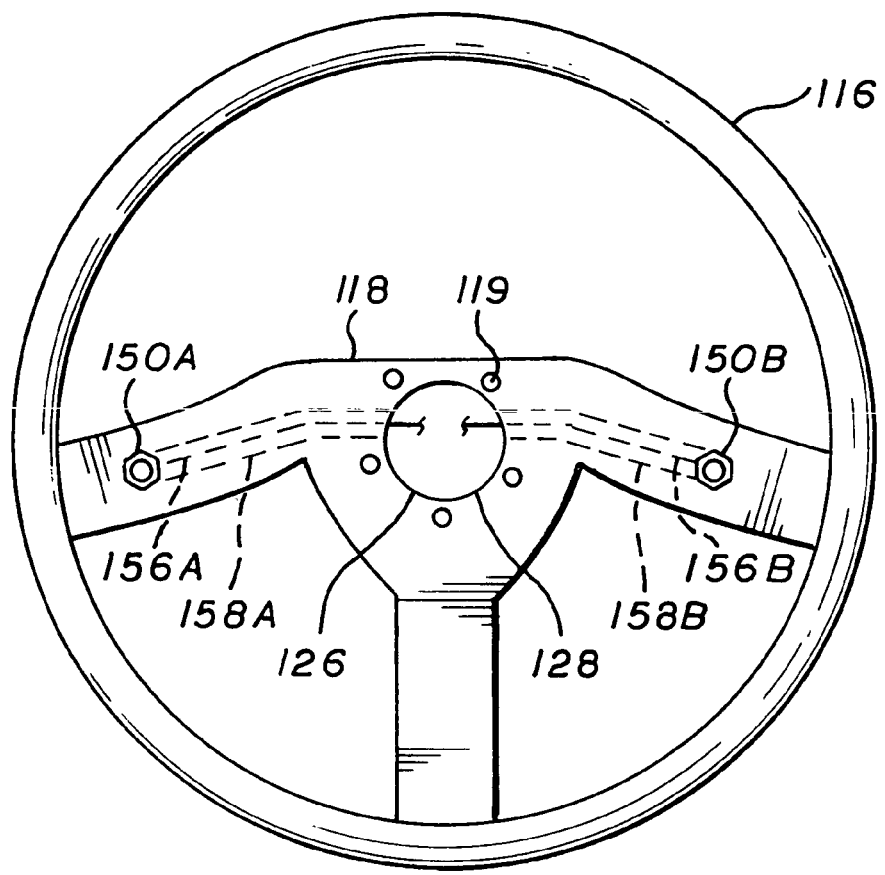
FIG. 9 is a second embodiment of the paddle and push button shifting actuators mounted on a steering wheel

Referring to FIG. 8, the switches 110A and 110B are connected in parallel to the horn wire 51A via resistor 134 and the switches 150A and 150B are connected in series to resistor 136, while the horn assembly is directly connected thereto. Of course, the wiring could be reversed, depending upon whether the arms 96A and 96B are used for up shifting and the switches 150A and 150B are used for down shifting.

Figure 10A:
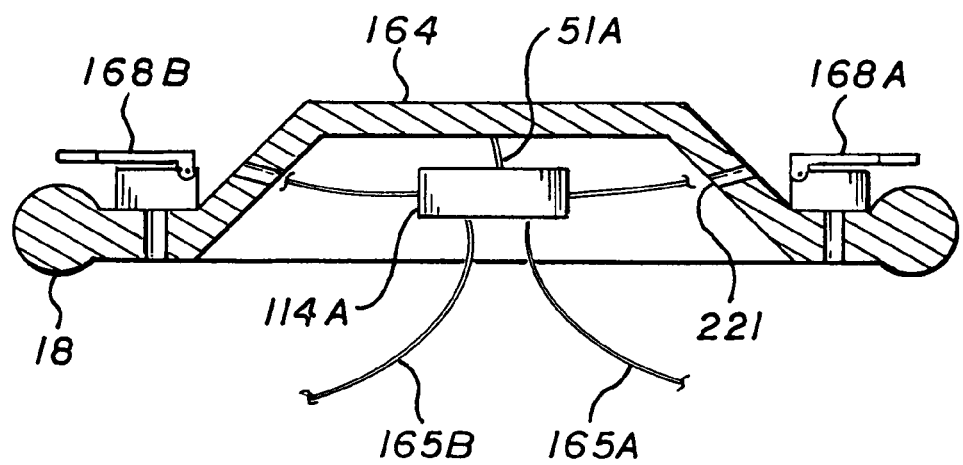
FIG. 10A is a cross-sectional view of a portion of the steering wheel incorporating an airbag.
Figure 10B:
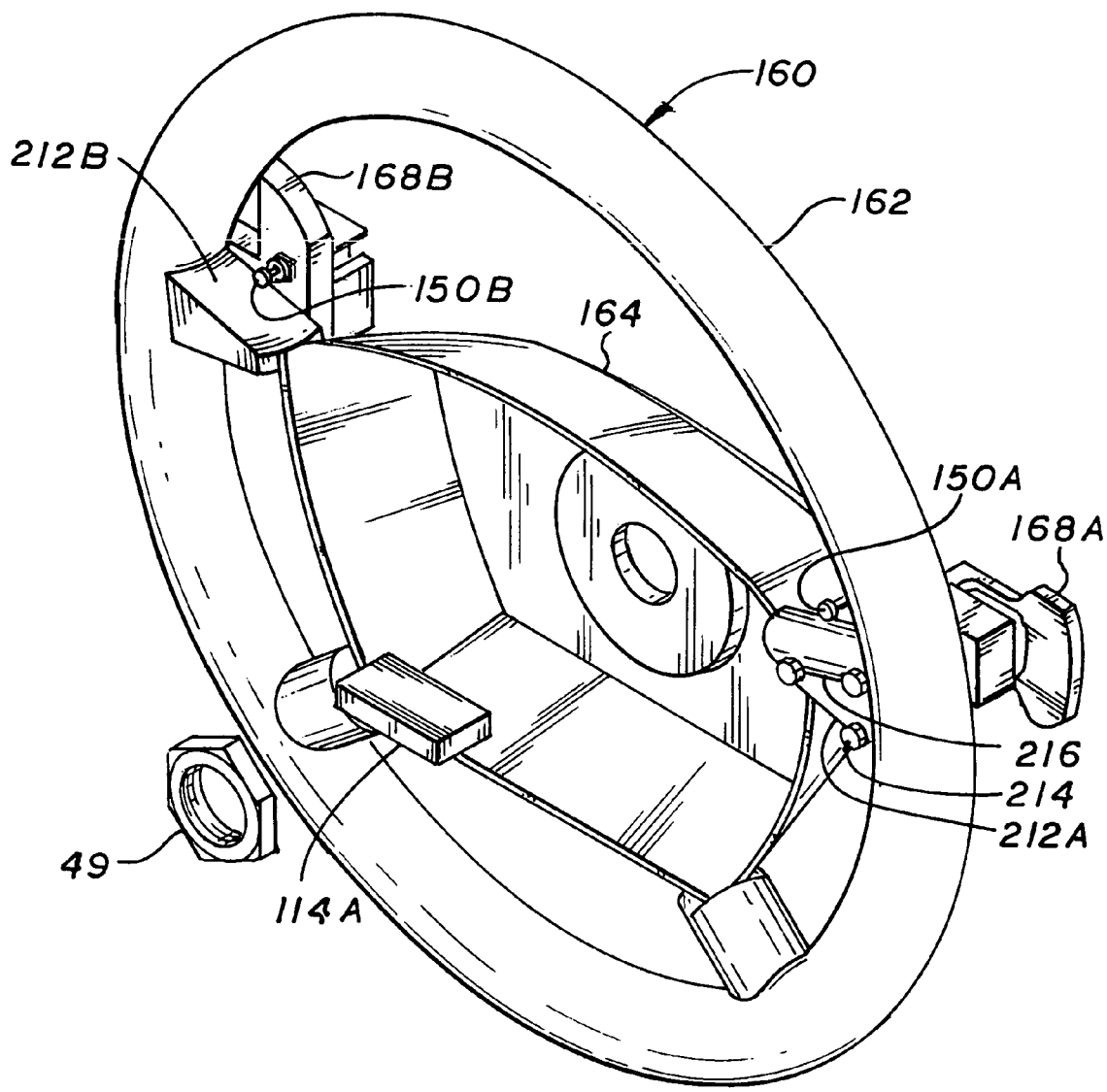
FIG. 10B is a side view of the airbag steering wheel shown in FIG. 10A illustrating how the shifter assemblies can be attached.

On newer automobiles, the steering wheel assembly incorporates an airbag, necessitating a slightly different approach. Referring to FIGS. 10 and 10B there is illustrated a steering wheel assembly 160 having a steering wheel 162 having an airbag container 164. Note that the horn actuator is part of the airbag assembly (not shown). It is typically a membrane type switch. However the horn wire 51A is shown connected to the module 114A mounted within the airbag chamber 164.

Figure 10C:
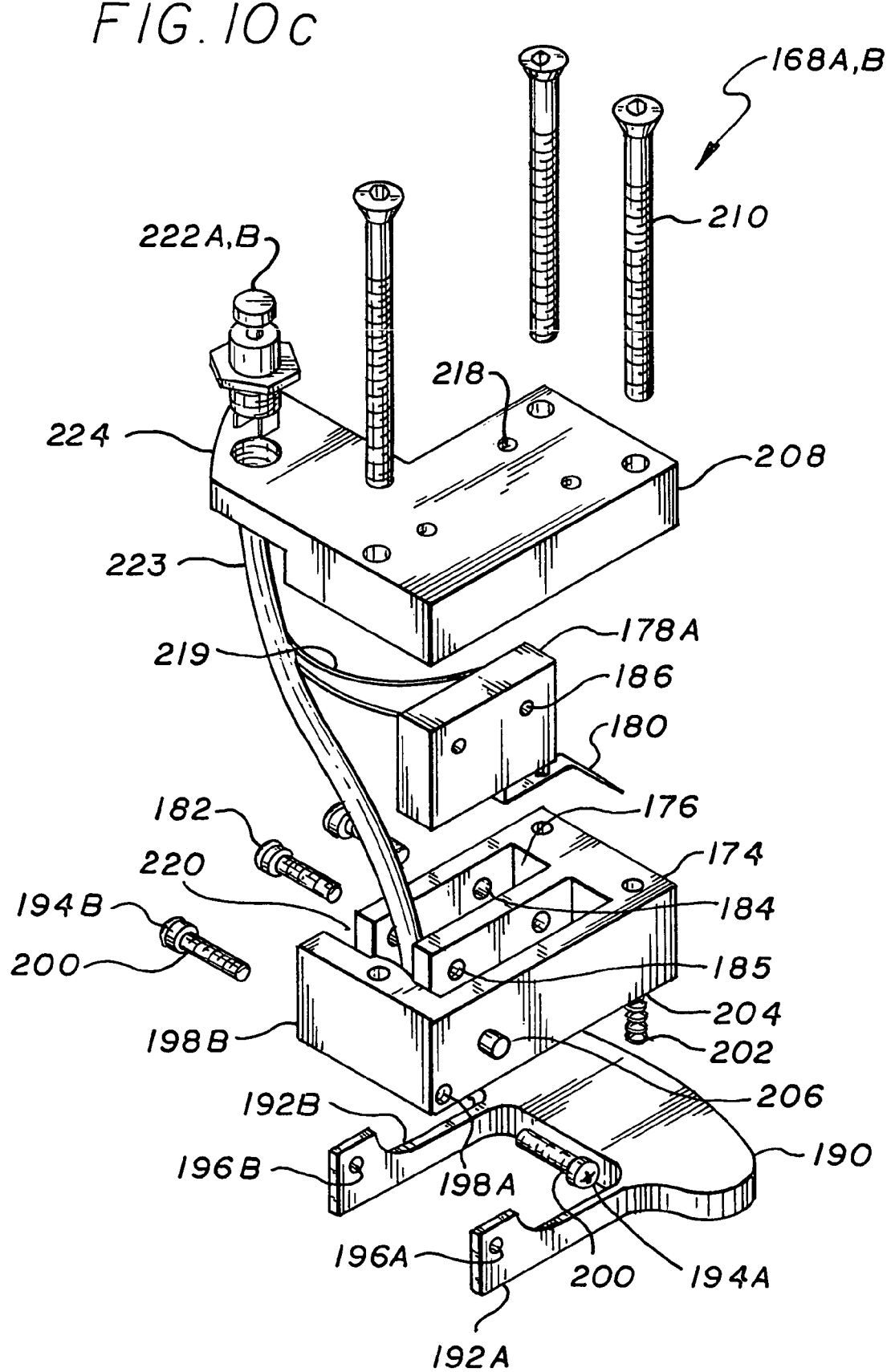
FIG. 10C is an exploded view of the shifter assemblies shown in FIG. 10A

The main difference is that the shifter assemblies 168A and 168B are mounted to the steering wheel 162. There are many ways to mount the assemblies. In this example, as illustrated in FIG. 10C, each of the shifter assemblies 168A and 168B, which are identical, includes a housing 174 having a slot 176 through which is mounted a switch 178A with an actuating arm 180. The switch 178 is secured in the slot 176 by fasteners 182 that extend through holes 184 in the housing and holes 186 in the switch 178A and engage threaded holes 185. A paddle type arm 190 having two arms 192A and 192B is mounted to the housing 174 by means of fasteners 194A and 194B that extend through holes 196A and 196B in the arms and into thread holes 198A and 198B. The fasteners 194A and 194B include bearing surfaces 200 that allow the arm 190 to rotate. A spring 202 is secured in a hole 204 by potting material (not shown) and extends there out making contact with the arm 190 biasing it away from the arm. A pin 206 protruding from the housing 174 limits movement away from the arm 190. A cover 208 secured by flush head screws 210 seals off the interior of the housing 174.

The shifter assemblies 168A and 168B are mounted to steering wheel arms 212A and 212B by means of fasteners 214 that extend through drilled hole 216 and engage threaded holes 218 in the cover 208. A wire 219 extends out a slot 220 in the housing 174 and through a hole 221 in the airbag container 164 and to the module 114. As in the previous example, if separate up shifting and down shifting is desired button type switches 222A and 222B can be mounted to an extension arm 224 on the cover 208 and connected along with switches 178A and 178B to a control module 114A via wire 223.

Figure 11:
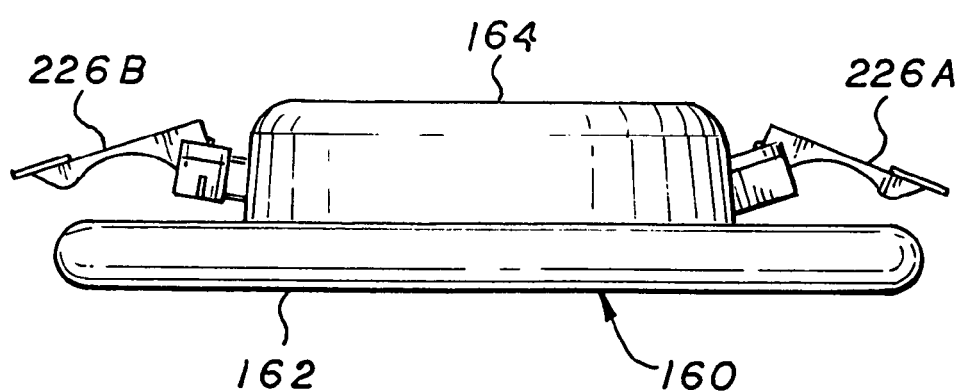
FIG. 11 is a side view of an airbag steering wheel shown in FIG. 10A illustrating a second version of the shifting actuators mounted on the airbag housing.
Figure 12:
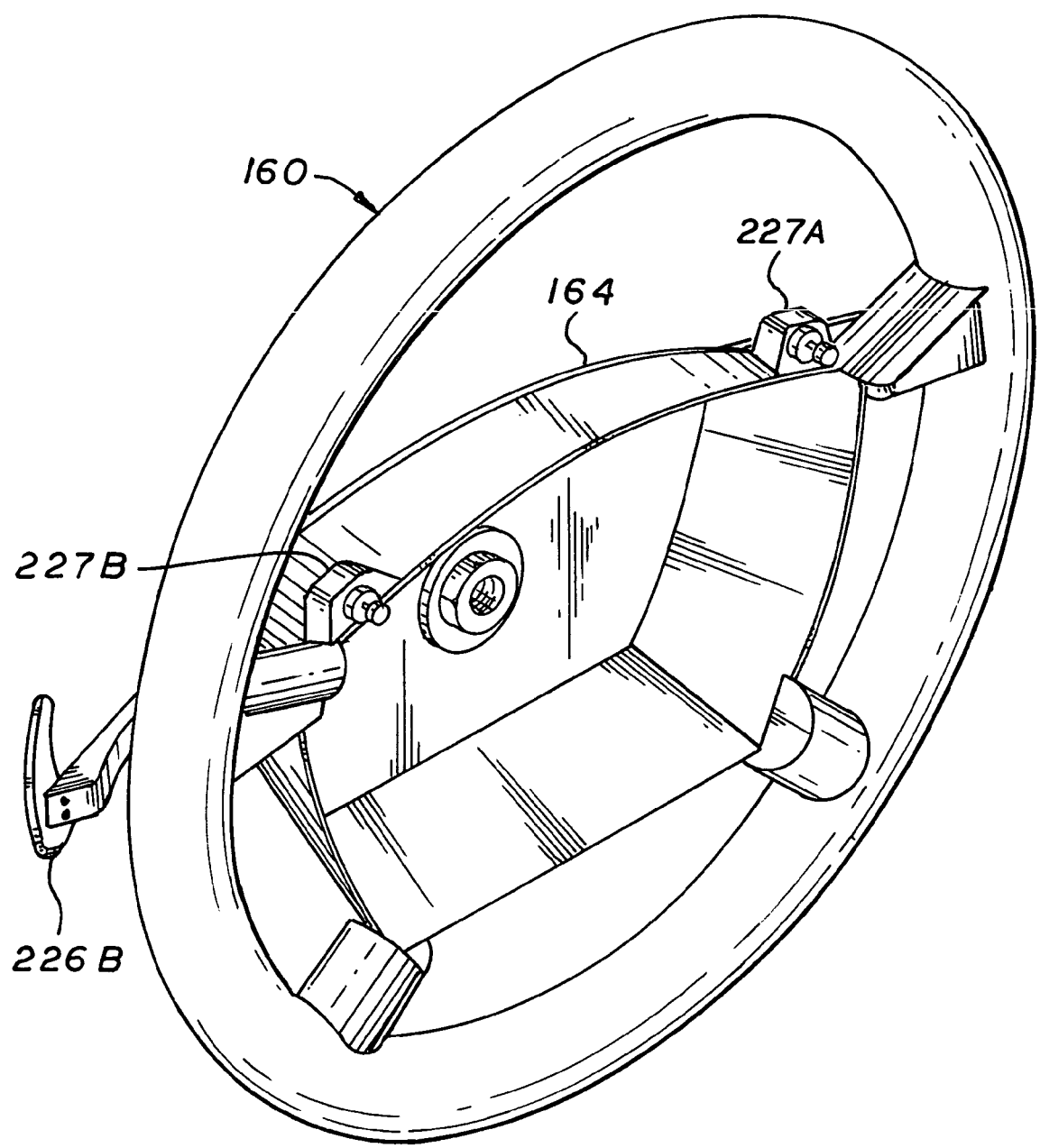
FIG. 12 is a perspective view of steering wheel shown in FIG. 11

Illustrated in FIGS. 11 and 12 is a third version wherein the shifter assemblies 226A and 226B are mounted directly to the airbag housing 164 as well as the shifter assemblies 227A and 227B (button switches). This arrangement simplifies the installation and leaves the steering wheel 162 unaltered.

Referring to FIGS. 3A, 7 and 8, the wire 51A that exits from the steering column is connected to a horn actuating relay 230, passing through a transmission shifter circuit 260/260A measuring the current flowing in the wire. The horn relay 230 requires a full 12 volts to actuate. However, when switches 110A and/or 110B are closed, the voltage is dropped significantly due to the resistors 134 and 136, respectively, so the horn relay (and consequently the horn) will not be activated.

Figure 13:
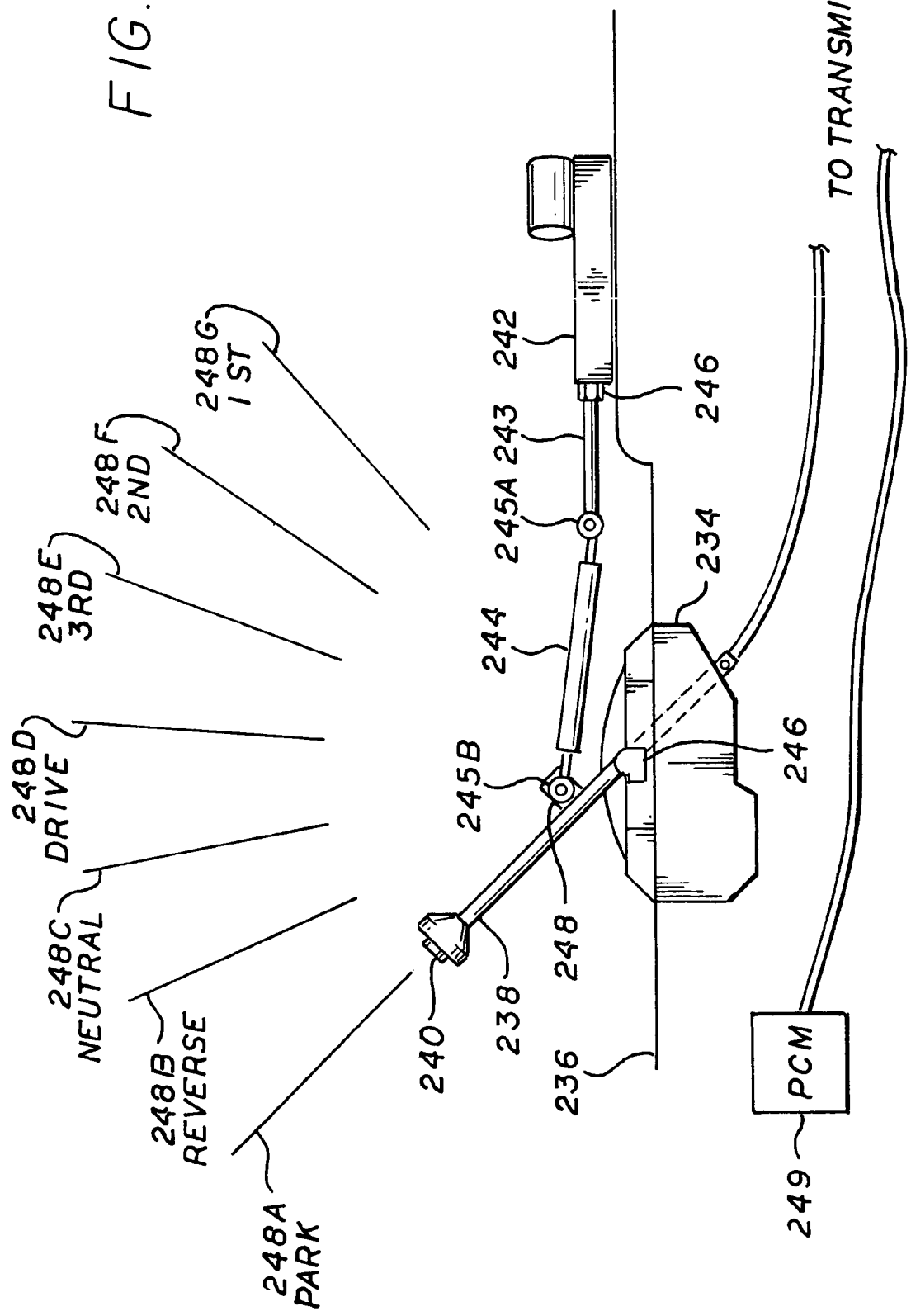
FIG. 13 is a side view of a transmission actuator assembly.

Referring to FIG. 13, a conventional transmission shifting assembly 234 is shown mounted on a center console 236. Such shifting assemblies include a lever 238 having a push button locking device, as illustrated a top mounted push button 240 that must be depressed in order to shift out of park or reverse or vice versa. In other designs, a T shaped handle is mounted about the lever 238 and must be fitted upward. This feature must be removed disabled or locked in the depressed position by a pin or the like. An actuator 242 having an output shaft 243 is coupled to the handle 238 by means of link 244 pivotally connected at both ends 245A and 245B to the lever 238 and output shaft. A position indicator 246 is mounted to the lever 238 for providing output shaft's position 248. Thus park position is 248A, reverse position is 248B, neutral is 248C, drive is 248D, third is 248E, second is 248F and first is 248G. Of course, five or six speed transmission would have additional positions. Additionally it should be noted that the existing transmission controller 249, coupled to the transmission, remains in operation.

Figure 14:
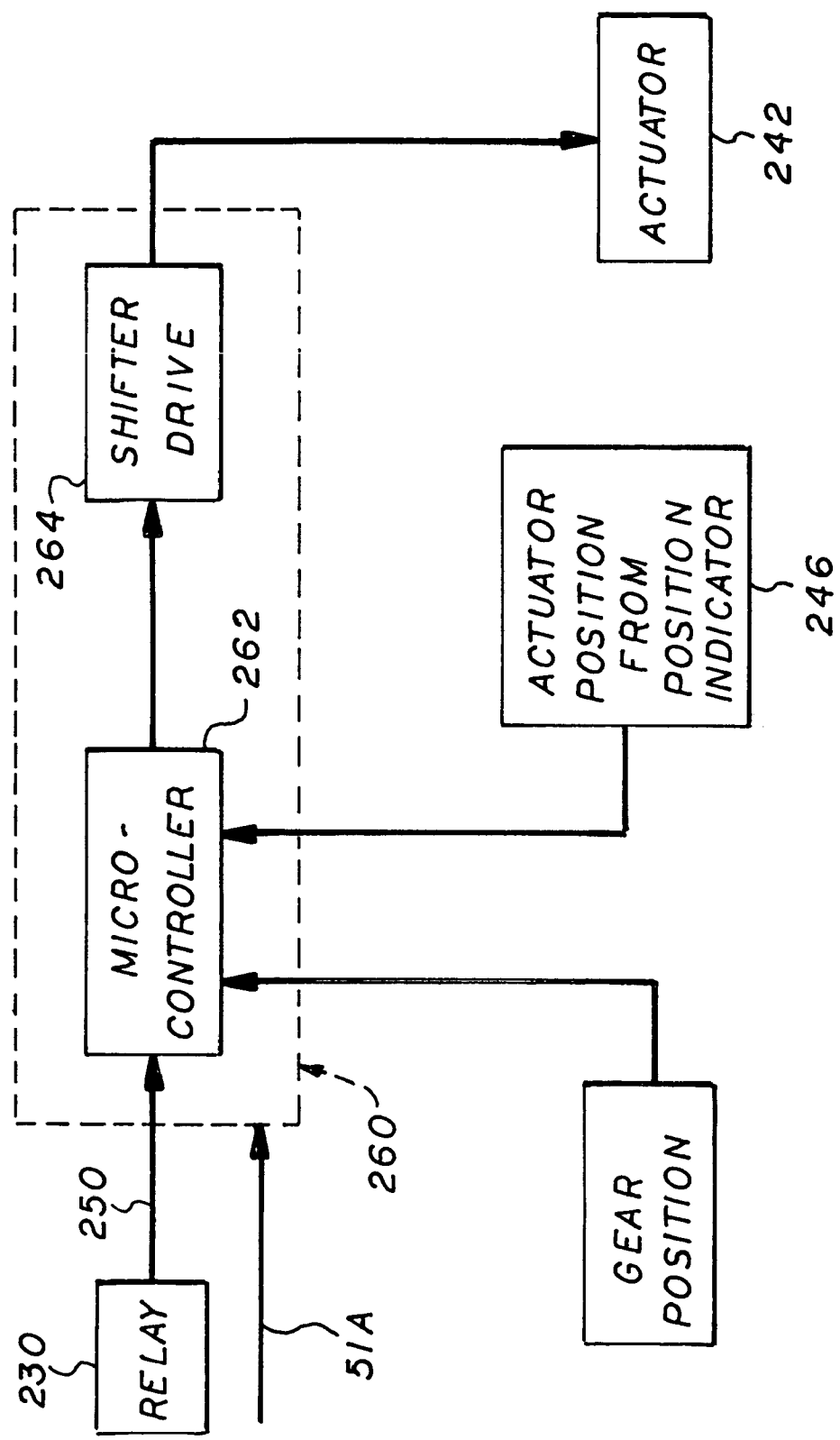
FIG. 14 is a simplified schematic of the electronic control circuit for the embodiment shown in FIG. 13.

Referring to FIG. 14, a wire 51A connects the module 114 or 114A to a transmission shifter circuit 260, which in turn is coupled to the actuator 242 and position indicator 246. Thus is can be seen that any safety interlocks built into the automobile, such as requiring the foot on the brake prior to moving out of park, key removal possible only upon the transmission being in park, shifting into the park or reverse while going forward, or the prevention of down shifting if RPMs will be exceeded will remain in operation. Note that the push button détente 240 that prevents inadvertent shifting of the transmission is now accomplished by the steering wheel mounted shifters, which only allow one position change upon actuation, and the addition of a "Neutral" button that needs to be depressed in order to be able to shift into Neutral from any forward gear.

Figure 15:
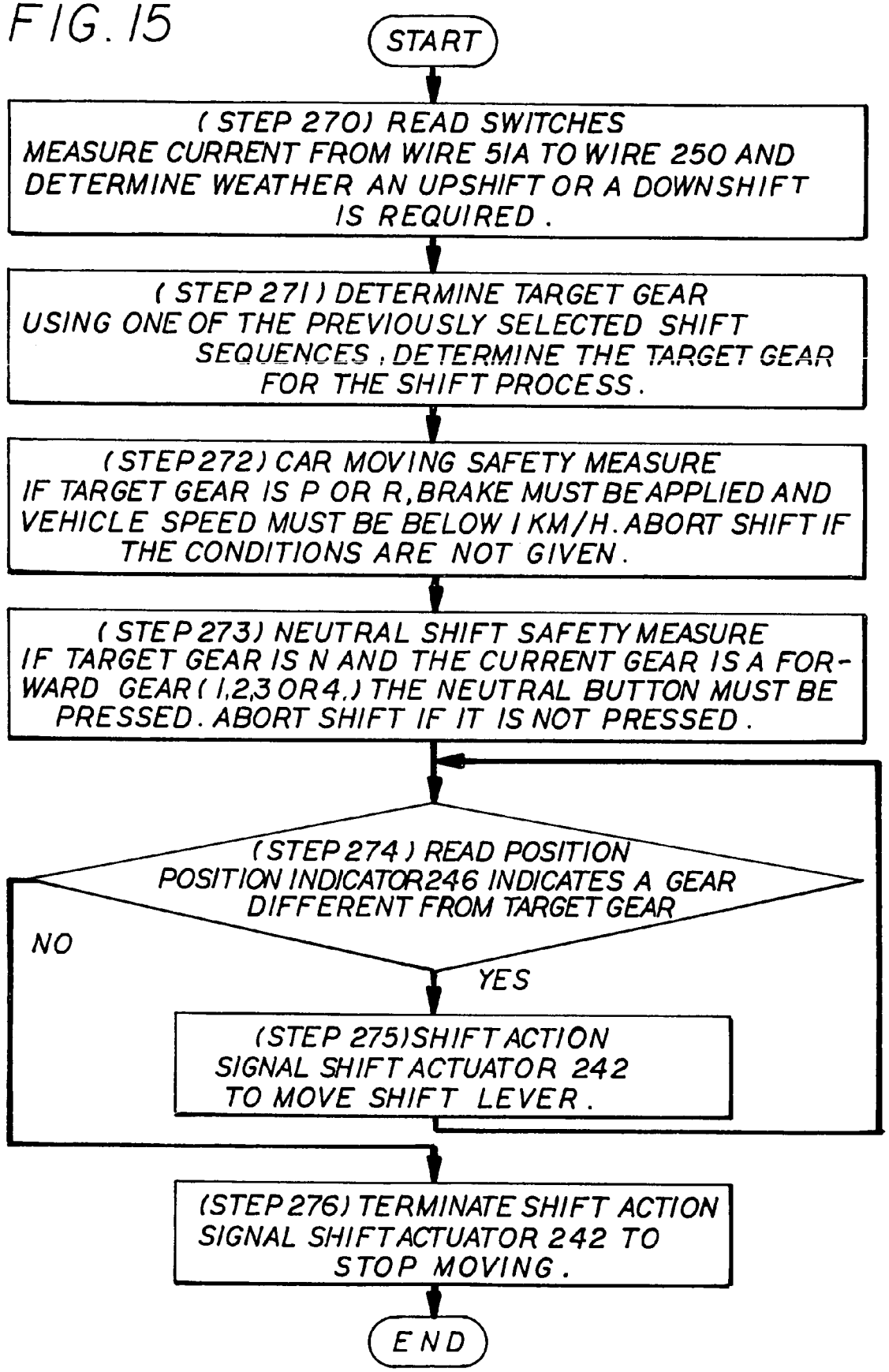
FIG. 15 is a flowchart for a computer program for the micro-controller shown in FIG. 14.

The shifter circuit 260 includes a micro-controller 262 coupled to a shifter driver 264, which in turn is coupled to the actuator 242. Referring to FIG. 15, the programming of the micro-controller 262 is very simple.

Step 270 Read Switches—Measure the current flowing in the wires 51A and 250 (which are connected through the shifter circuit 260) and determine whether an up shift or a down shift are required.

Step 271 Determine Target Gear—Using one of the selected shift sequences determine the target gear for the shift process.

Step 272 Car Moving Safety Feature—If the target gear is P or R, the brake must be applied and the vehicle speed must be below 1 km/h. The shift process is aborted if these conditions are not given.

Step 273 Neutral Shift Safety Measure—To prevent accidentally shifting into Neutral while driving, an additional button must be pressed before it is possible to shift from a forward gear into Neutral. The shift process is aborted if this button is not pressed.

Step 274 Read Position—Read position indicator 246 and compare the read gear with the target gear. If there is a difference, go to Step 275 and continue with the shift process. If there is no difference, go to Step 276 and terminate the shift process.

Step 275 Shift Action—Signal to the shift actuator 242 to move the shift lever in the required direction. Then go back to Step 274.

Step 276 Terminate Shift Action—Signal to the shift actuator 242 to stop moving.

Thus it can be seen that in this first embodiment, all the existing safety interlocks, if any, are retained. The existing gear selection display 14 (FIG. 1) remains operational. This system therefore requires a minimum change in the automobile's electronics.

Figure 16:
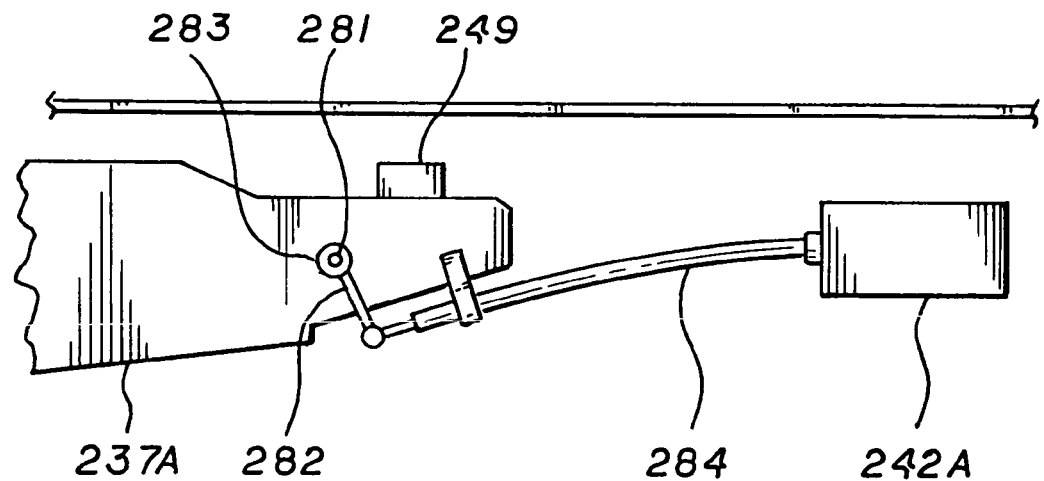
FIG. 16 is a side view of a second version of the transmission actuator system.

However, some automobiles do not have dashboard gear selector displays typically combined with gear selector counsel on the transmission housing and/or the transmission is electronically controlled, etc. Here it is necessary to by-pass the existing safety interlocks and also provide a separate gear selection display. In this version, illustrated in FIG. 16, the transmission 237A is actuated by rotation of a shaft 281 having a having a lever arm 282 attached thereto mounted in the side thereof. A potentiometer 283 is mounted to the shaft 281. The actuator 242A is connected to the shaft via a flexible shaft 284. Thus the transmission 237A is shifted by the actuator 242A causing rotation of the rod 281, with the potentiometer 283 indicating the gear selection.

Figure 17:
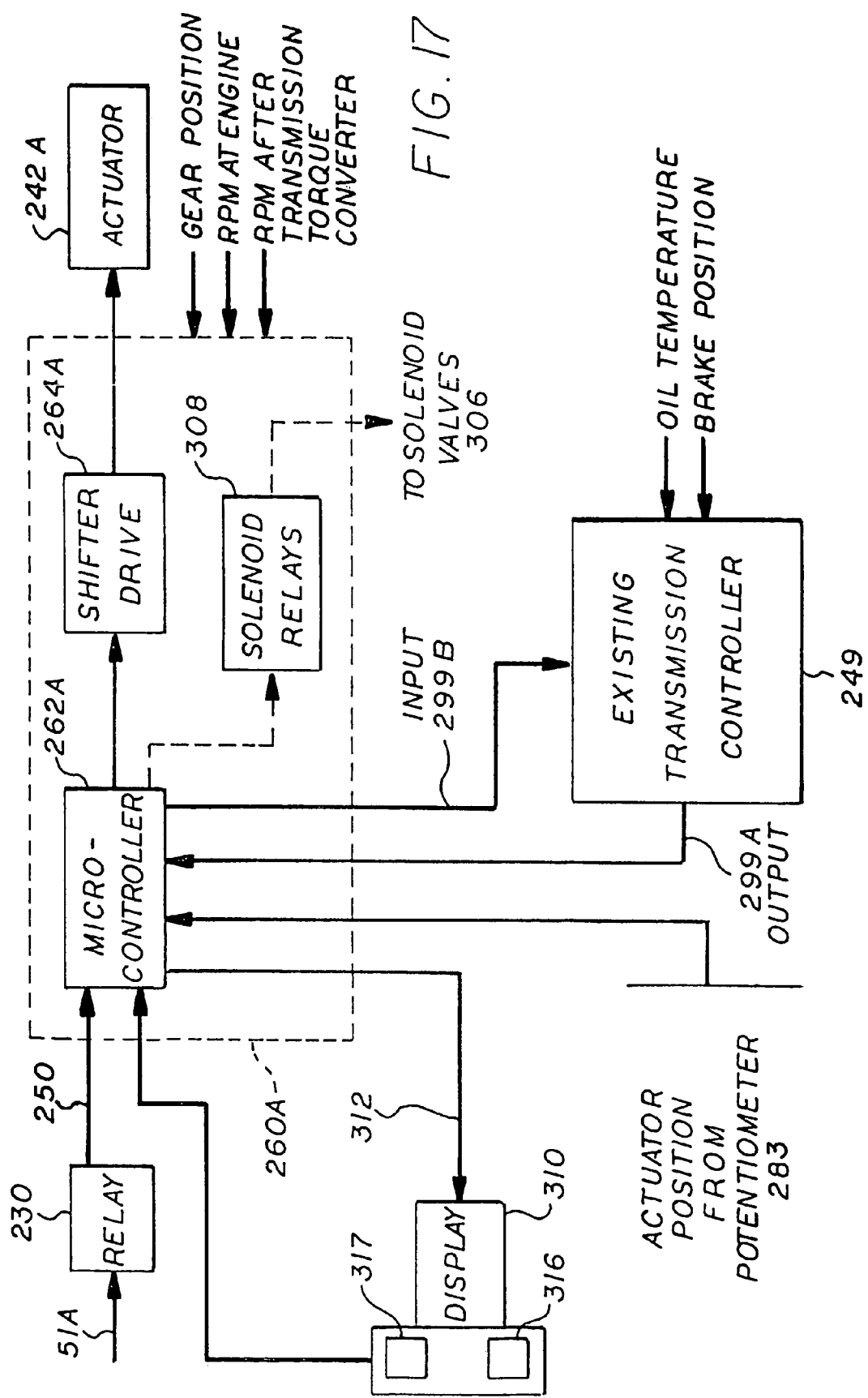
FIG. 17 is a schematic of the control circuit for the transmission actuator system shown in FIG. 16.

In addition, the existing transmission controller 249 is also coupled to the shifter circuit, now indicated by numeral 260A. Referring to FIG. 17, the shifter circuit 260A includes a micro-controller 262A coupled to actuator driver 264A. However, the micro-controller 262A is connected between the transmission controller 249 and the transmission. That is, all the signals between the controller 249 and the transmission, indicated by numerals 299A and 299B, are routed through the micro-controller 262A. Thus the rotational speed before and after the torque converter (not shown), transmission temperature, transmission gear position, solenoid control signals etc., are all routed through the micro-controller 262A. This is required because the transmission controller must be "fooled" into thinking that its shifting signals to the transmission are being carried out. Otherwise, the controller 249 would assume that something was wrong with the transmission and signal an error condition to the driver. The micro-controller 262A also receives signals from the potentiometer 283.

Figure 18:
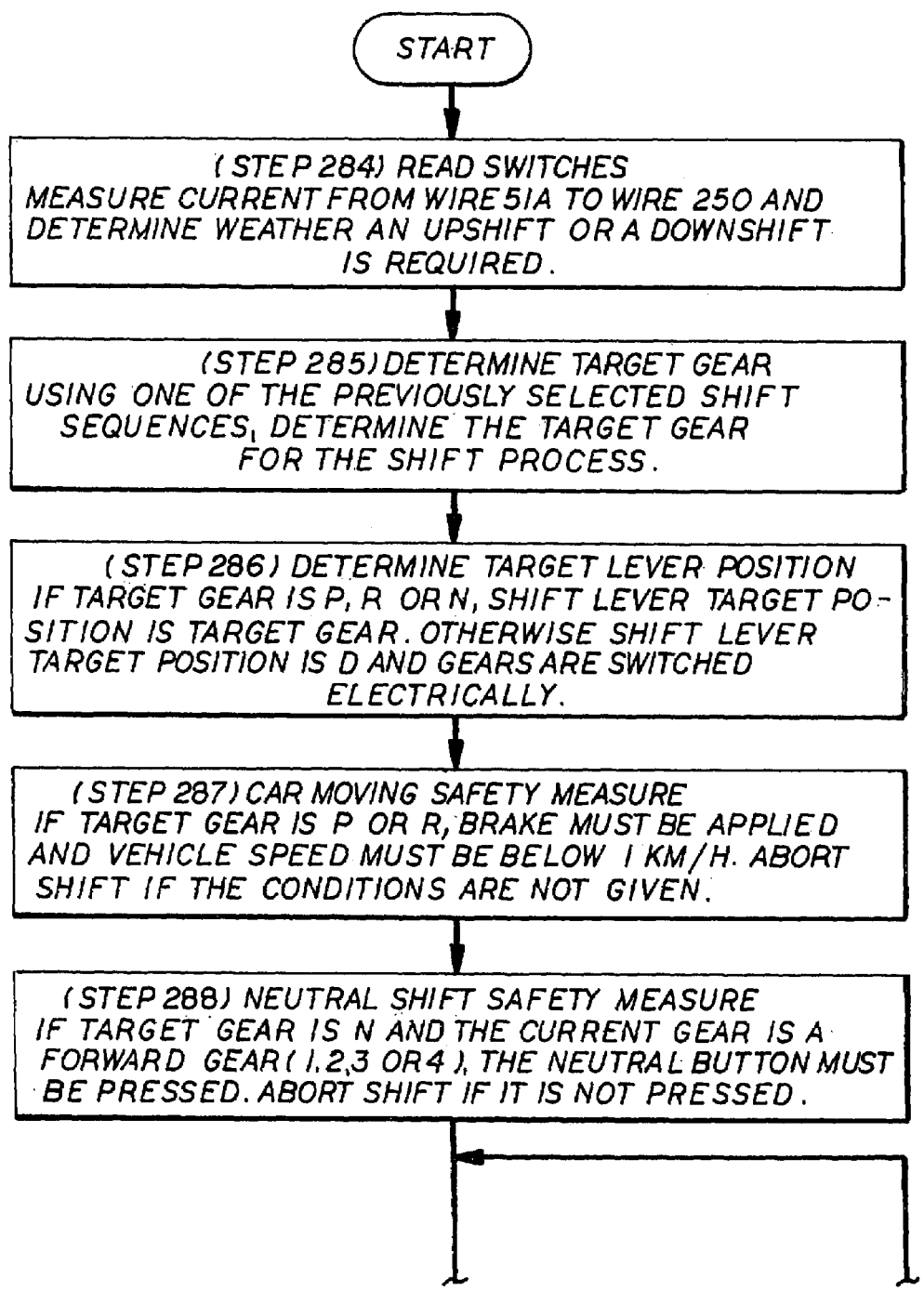
FIGS. 18A and 18B combined are a flowchart for the computer program for the micro-controller shown in FIG. 17.
Figure 18B:
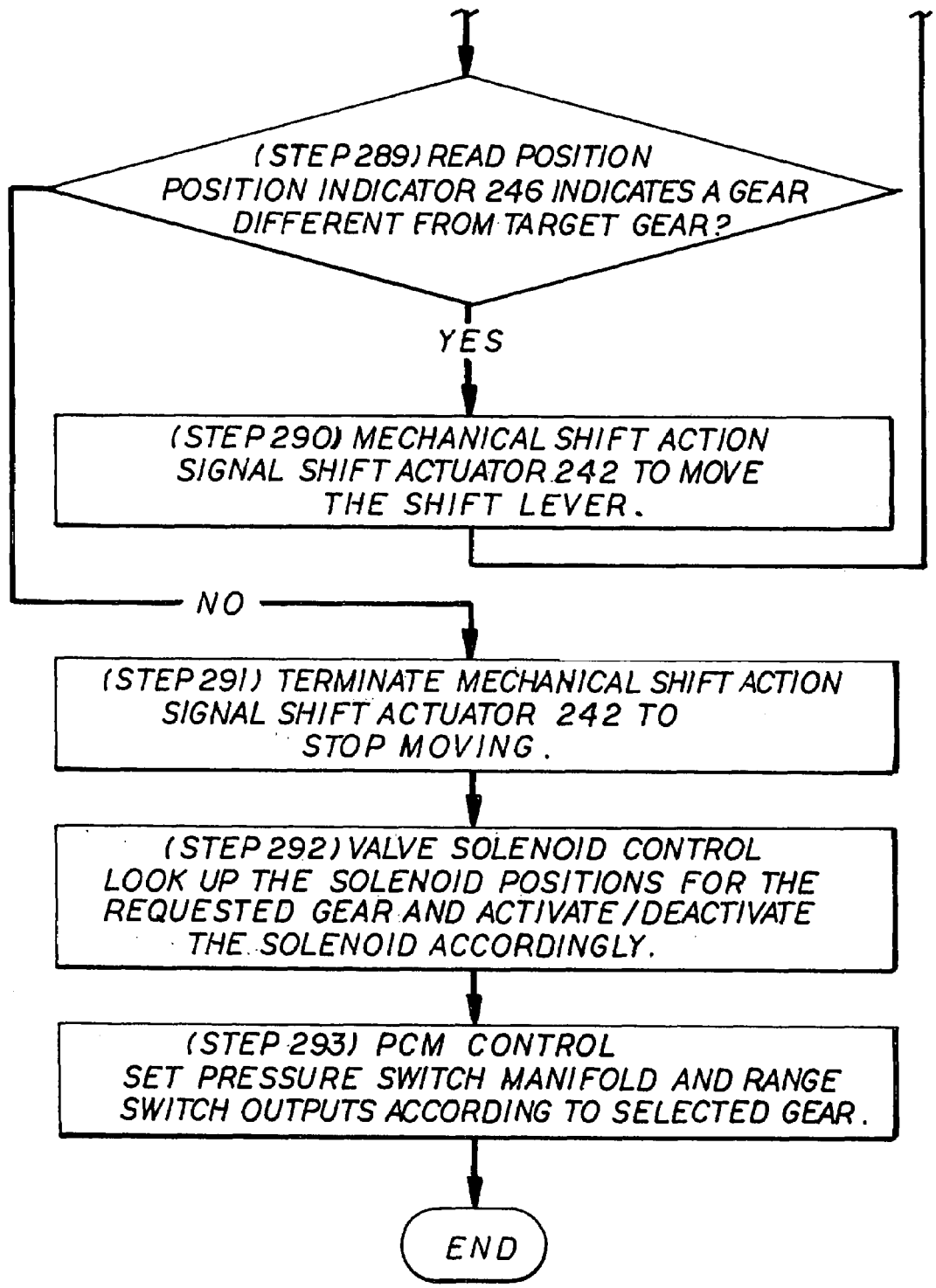

The flow chart for the computer program for the micro-controller 262A is provided in FIGS. 18A and 18B. The flow chart comprises the following steps:

Step 284 Read Switches—Measure the current flowing in the wires 51A and 250 (which are connected through the shifter circuit 260A) and determine whether an up shift or a down shift are required.

Step 285 Determine Target Gear—Using one of the selected shift sequences (see FIG. 15A for an example), determine the target gear for the shift process.

Step 286 Determine Target Lever Position—Forward gears are selected through solenoid valves while the lever remains in position Drive, all other gears need to be shifted using the lever.

Step 287 Car Moving Safety Feature—If the target gear is P or R, the brake must be applied and the vehicle speed must be below 1 km/h. The shift process is aborted if these conditions are not given.

Step 288 Neutral Shift Safety Measure—To prevent accidentally shifting into Neutral while driving, an additional button must be pressed before it is possible to shift from a forward gear into Neutral. The shift process is aborted if this button is not pressed.

Step 289 Read Position—Read position indicator 246 (potentiometer 283) and compare the read lever position with the target lever position. If there is a difference, go to Step 290 and continue with the mechanical shift process. If there is no difference, go to Step 291, terminate the mechanical shift process and continue with the remainder of the shift process.

Step 290 Mechanical Shift Action—Signal to the shift actuator 242A to move the shift lever in the required direction. Then go back to Step 289.

Step 291 Terminate Mechanical Shift Action—Signal to the shift actuator 242A to stop moving.

Step 292 Valve Solenoid Control: Based on a solenoid activation table that is a characteristic of a given transmission model, the solenoids that need to be activated to put the transmission into a certain gear are determined and activated or deactivated accordingly.

Step 293 PCM Control: The transmission often reports its state back to the car's Powertrain Control Module (PCM) through a series of switches. One type of such switches are pressure switches mounted inside the transmission that capture control fluid pressure in several places, another type are range switches mounted on the shaft 281. The signals from both types get intercepted by the transmission controller 260A and appropriate signals sent to the PCM.

Figure 19:
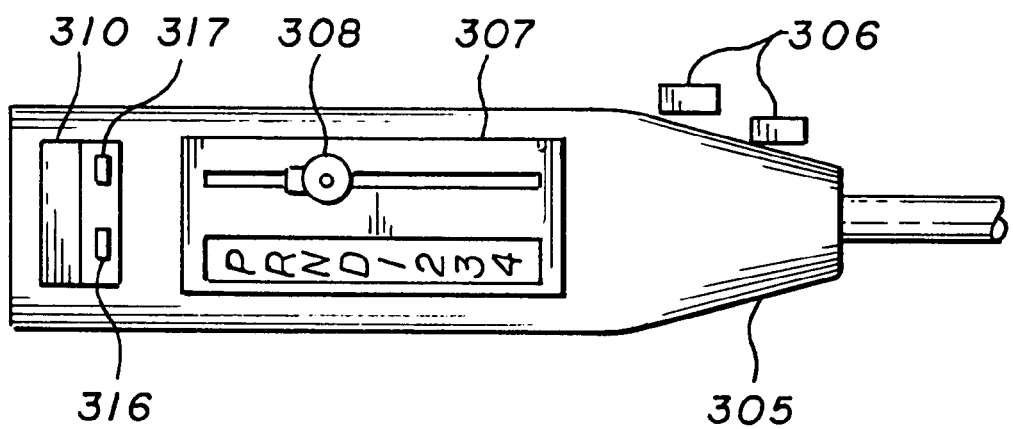
FIG. 19 is a top view of a third actuation system for a transmission.

FIG. 19 illustrates an electronically controlled transmission 305, using solenoid valves 306 with a gear shift assembly 307 with gear selector 308 in the drive position. Here, the transmission can be placed in drive, and the transmission 305 will automatically up shift or down shift, as required by driving conditions, or the forward gears 1 through 4 can be manually shifted from the steering wheel. Referring back to FIG. 17, here the micro-controller 262A is not connected to the shifter driver 264A. Thus the transmission 305 can be manually placed in "Drive" position and then shifted electronically from the steering wheel.

Also shown in FIG. 19 is a display module 310 mounted in front of the gear shift assembly 307. This may be required in vehicles that do not have a display 14 on the instrument panel 12. Referring to FIG. 17, the micro-controller 262A can be used to provide signals to the display module through a bus 312, preferably a CANbus protocol. While the display module 310 is shown mounted over the transmission, it could be mounted in other locations. The display module could be used with all the previous examples. In addition, the display module 310 could have mounted up shift and down shift switches 316 and 317, which can be connected to the transmission control circuit 260A, as shown in FIG. 17. Thus should the shifter assemblies on the steering wheel fail, for any reason, transmission shifting could still be accomplished.

Figure 20:
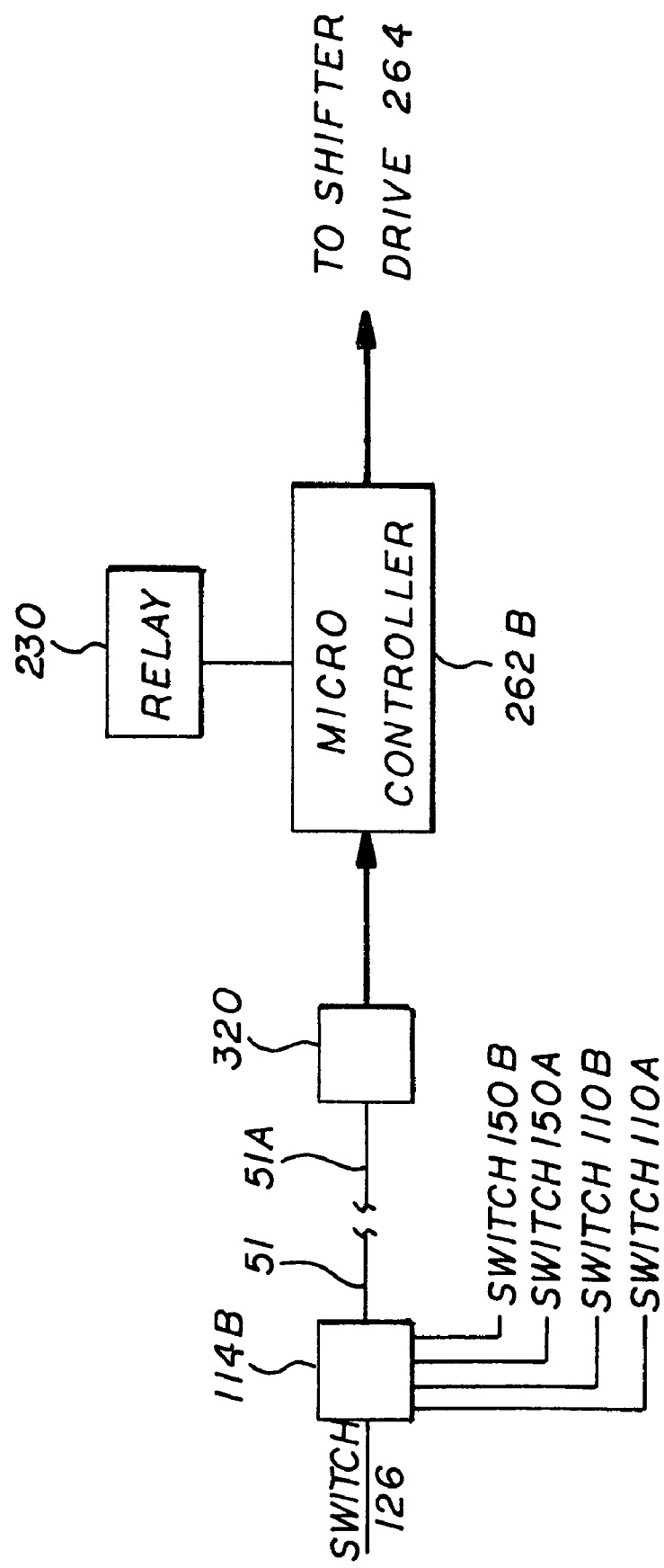
FIG. 20 is a schematic of the digital paddle shifter.

Referring to FIG. 3A, 5 and FIG. 20 it can be seen that the shifter signals from switches 110A, 110B, 150A and 150B are coupled to a digital signal generator 114B mounted in the steering wheel assembly, which provides digital signals via wires 51 and 51A to a digital receiver 320. The digital receiver is connected to a micro-controller 262B similar to micro-controller 262A. However it is coupled to horn relay 230 as well as shifter 264. In operation, the digital signal generator 114B generates separate digital signals for the horn switch 126 and switches 110A and 110B, and 150A and 150B. The micro-controller is programmed to recognize these digital signals and send actuation signals to the horn relay 230 or shifter drive 264.

While the invention has been described with reference to particular embodiments, it should be understood that the embodiments are merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the automobile industry and, in particular, to the after-market automobile industry.

The invention claimed is:

1. An automatic transmission shifting system for automobile, the automobile having a steering column assembly including a steering wheel at one end and steering column, and a single electrical wire having a first end terminating at the steering wheel and a second end terminating at least partially down the steering column, the system comprising:
a first shifting actuator mounted to the steering wheel assembly, said first shifting actuator for initiating up shifts in the transmission by movement thereof and providing an up shift signal to the first end of the wire, said first shifting actuator including:
a first normally open switch coupled to the wire positioned on the steering wheel assembly adapted to be actuated to the closed position; and
a first resistor with a first resistance value in series with said first switch; such that when said first switch is closed a first current is produced in the wire;
a second shifting actuator mounted on the steering wheel assembly, said second shifting actuator for initiating down shifts in the transmission by movement thereof and providing a down shift signal to the first end of the wire, said second shifting actuator including,
a second normally open switch coupled to the wire positioned on the steering wheel assembly adapted to be actuated to the closed position; and
a second resistor with a second resistance value in series with said second switch; such that when said second switch is closed a second current is produced in the wire; and
transmission actuation means coupled to the second end of the wire for up shifting and down shifting the transmission in response to said up shift signal and said down shift signals, respectively.

2. The system as set forth in claim 1 comprising:
said transmission actuation means adapted to receive said first and second currents and to up shift or down shift the transmission in response to the receipt of said first and second currents.

3. The system as set forth in claim 1, or 2, wherein said first and second switches include a button for actuating said switches to said closed position.

4. The system as set forth in claim 1 or 2, wherein said first and second switches include a lever for actuating said switches to said closed position.

5. The system as set forth in claim 4 wherein the automobile includes an instrument panel, the system comprising:
a gear selection display on the instrument panel electrically coupled to said transmission actuation means; and
said transmission actuation means including a signal generating means for providing a gear selection indication signal to said gear selection display.

6. An automatic transmission shifting system for automobile, the automobile having a steering column assembly including a steering wheel at one end and steering column, the system comprising:
- a horn circuit comprising:
  - an actuation button;
  - a first horn normally open switch; and
  - a wire coupled to said switch, said electrical wire having first end terminating at the steering wheel and a second end terminating at least partially down the steering column;
- a first shifting actuator mounted to the steering wheel assembly, said first shifting actuator for initiating up shifts in the transmission by movement thereof and providing an up shift signal to the first end of said wire;
- a second shifting actuator mounted on the steering wheel assembly, said second shifting actuator for initiating down shifts in the transmission by movement thereof and providing a down shift signal to the first end of the wire;
- transmission actuation means for up shifting and down shifting the transmission in response to said up shift and said down shift signals, respectively.

7. The shifting system as set forth in claim 6 comprising:
said first shifting actuator including:
- a first shifting normally open switch coupled to said wire positioned on the steering wheel assembly adapted to be actuated to the closed position; and
- a first resistor with a first resistance value in series with said first switch; such that when said first switch is closed a first current is produced in said wire; and said second shifting actuator including:
- a second shifting normally open switch coupled to said wire positioned on the steering wheel assembly adapted to be actuated to the closed position; and
- a second resistor with a second resistance value in series with said second switch; such that when said second switch is closed a second current is produced in said wire.

8. The system as set forth in claim 7 comprising:
an electrical circuit coupled to said first and second shifter actuator and adapted to provide first and second digital signals, respectively to said transmission actuation means by means of said wire; and
said transmission actuation means adapted to receive said first and second digital signals and to up shift or down shifting the transmission in response to the receipt of said first and second digital signals.

9. The system as set forth in claim 7, or 8, wherein said first and second switches include a button for actuating said switches to said closed position.

10. The system as set forth in claim 7, or 8, wherein said first and second switches include a lever for actuating said switches to said closed position.

11. The system as set forth in claim 10 wherein the automobile includes an instrument panel, the system comprising:
- a gear selection display on the instrument panel electrically coupled to said transmission actuation means; and
- said transmission actuation means including a signal generating means for providing a gear selection indication signal to said gear selection display.

\* \* \* \* \*